(12) United States Patent
Chiyo

(10) Patent No.: US 10,474,401 B2
(45) Date of Patent: Nov. 12, 2019

(54) INFORMATION PROCESSING SYSTEM FOR DISTRIBUTING CONTENT IN RESPONSE TO A REQUEST

(71) Applicant: Naoki Chiyo, Kanagawa (JP)

(72) Inventor: Naoki Chiyo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/084,933

(22) PCT Filed: Dec. 9, 2016

(86) PCT No.: PCT/JP2016/086807
§ 371 (c)(1),
(2) Date: Sep. 13, 2018

(87) PCT Pub. No.: WO2017/158962
PCT Pub. Date: Sep. 21, 2017

(65) Prior Publication Data
US 2019/0050176 A1 Feb. 14, 2019

(30) Foreign Application Priority Data

Mar. 18, 2016 (JP) ................................ 2016-055086

(51) Int. Cl.
*G06F 15/00* (2006.01)
*G06F 3/12* (2006.01)
(Continued)

(52) U.S. Cl.
CPC ............ *G06F 3/1232* (2013.01); *B41J 29/38* (2013.01); *G06F 3/121* (2013.01); *G06F 3/1203* (2013.01);
(Continued)

(58) Field of Classification Search
CPC ...... G06F 3/1232; G06F 3/1203; G06F 3/121; G06F 3/1218; G06F 3/1229;
(Continued)

(56) References Cited

U.S. PATENT DOCUMENTS 6,160,629 A   12/2000  Tang et al.
2003/0093670 A1  5/2003  Matsubayashi et al.
(Continued)

FOREIGN PATENT DOCUMENTS

EP  1 310 863 A2  5/2003
GB  2 346 471 A   8/2000
(Continued)

OTHER PUBLICATIONS

International Search Report dated Jan. 31, 2017 in PCT/JP2016/086807 filed on Dec. 9, 2016.
(Continued)

*Primary Examiner* — Douglas Q Tran
(74) *Attorney, Agent, or Firm* — Oblon, McClelland, Maier & Neustadt, L.L.P.

(57) ABSTRACT

An information processing system includes an apparatus and a server system. The server system includes an apparatus information receiving unit, a content generation unit, a content information request receiving unit, a content information transmitting unit, a content request receiving unit, and a content transmitting unit. The apparatus information receiving unit receives apparatus information. The content generation unit generates a content based on the apparatus information. The content information request receiving unit receives a content information request from the apparatus. The content information transmitting unit transmits content information that can identify one or more contents generated by the content generation unit to the apparatus. The content request receiving unit receives a content request from the
(Continued)

apparatus. The content transmitting unit transmits the content to the apparatus.

14 Claims, 24 Drawing Sheets

(51) Int. Cl.
    *G06K 1/00*     (2006.01)
    *B41J 29/38*     (2006.01)
    *H04N 1/00*     (2006.01)
    *H04N 1/23*     (2006.01)

(52) U.S. Cl.
CPC .......... *G06F 3/1218* (2013.01); *G06F 3/1229* (2013.01); *G06F 3/1273* (2013.01); *G06F 3/1287* (2013.01); *G06F 3/1288* (2013.01); *H04N 1/00* (2013.01); *H04N 1/2346* (2013.01); *G06F 3/122* (2013.01); *H04N 2201/0094* (2013.01)

(58) Field of Classification Search
CPC .... G06F 3/1273; G06F 3/1287; G06F 3/1288; G06F 3/122; H04N 2201/0094; H04N 1/00; H04N 1/2346
USPC .............................. 358/1.1, 1.15, 1.13, 1.14
See application file for complete search history.

(56) References Cited

U.S. PATENT DOCUMENTS

| | | | |
|---|---|---|---|
| 2011/0067023 | A1 | 3/2011 | Chiyo et al. |
| 2016/0277241 | A1* | 9/2016 | Nakamori ........... H04L 41/0813 |
| 2016/0299730 | A1* | 10/2016 | Tsunekawa ........... G06F 3/1247 |

FOREIGN PATENT DOCUMENTS

| | | |
|---|---|---|
| JP | 2001-045412 | 2/2001 |
| JP | 2002-163170 | 6/2002 |
| JP | 2006-040038 | 2/2006 |
| JP | 2010-161661 A | 7/2010 |
| JP | 2011-227790 | 11/2011 |
| JP | 5468829 | 2/2014 |

OTHER PUBLICATIONS

Extended European Search Report dated Jan. 4, 2019 in European Patent Application No. 16894579.8, 10 pages.

* cited by examiner

FIG.5

| APPARATUS ID | DATE AND TIME OF NOTIFICATION | UTILIZATION AMOUNT INFORMATION | | | | ABNORMALITY PRESENCE INFORMATION | REMAINING AMOUNT INFORMATION |
|---|---|---|---|---|---|---|---|
| | | TOTAL COUNTER | MONO-CHROME COUNTER | COLOR COUNTER | TWO SIDES COUNTER | PRESENCE OR ABSENCE OF ABNORMALITY | TONER REMAINING AMOUNT |
| 3C66-000001 | 2015/11/6 9:00 | 100 | 50 | 50 | 10 | NORMAL | 90 |

FIG.12

| APPARATUS ID | DATE AND TIME OF RECEPTION | DATE AND TIME OF NOTIFICATION | TOTAL COUNTER | TWO SIDES COUNTER | PRESENCE OR ABSENCE OF ABNORMALITY | TONER REMAINING AMOUNT |
|---|---|---|---|---|---|---|
| 3C66-000001 | 2015/11/7 12:00 | 2015/11/6 9:00 | 100 | 10 | NORMAL | 90 |
| 3C66-000002 | 2015/11/7 12:00 | 2015/11/6 10:00 | 200 | 5 | NORMAL | 80 |
| 3C66-000003 | 2015/11/7 12:00 | 2015/11/6 11:00 | 100 | 20 | OUT OF ORDER | 70 |
| 3C66-000004 | 2015/11/7 12:00 | 2015/11/6 12:00 | 150 | 40 | OUT OF ORDER | 60 |

FIG.13

WE APOLOGIZE FOR THE INCONVENIENCE.
A SERVICEMAN IS BEING DISPATCHED.
THE ESTIMATED ARRIVAL TIME IS AROUND 3 P.M. ON JANUARY 29$^{TH}$.
PLEASE WAIT FOR A WHILE.
CAUSE: OCCURRENCE OF PAPER JAM

FIG.14

APPARATUS NUMBER OF
DELIVERY DESTINATION: 3FXX-1800XX
DELIVERY DESTINATION: XYZ

| ORDER DATE | PRODUCT NAME | DELIVERY STATUS |
|---|---|---|
| 2015/01/01 | MP P TONER BLACK C5002 | SHIPMENT COMPLETED (2015/01/02 DELIVERY SCHEDULE) |
| 2015/02/10 | MP P TONER CYAN C5002 | SHIPMENT COMPLETED (2015/02/11 DELIVERY SCHEDULE) |
| 2015/02/19 | MP P TONER BLACK C5002 | SHIPMENT COMPLETED (2015/02/20 DELIVERY SCHEDULE) |
| 2015/02/25 | MP P TONER MAGENTA C5002 | SHIPMENT COMPLETED RETURN |
| 2015/03/07 | MP P TONER BLACK C5002 | SHIPMENT COMPLETED (2015/03/07 DELIVERY SCHEDULE) |
| 2015/03/10 | MP P TONER YELLOW C5002 | SHIPMENT COMPLETED RETURN |
| 2015/03/11 | MP P TONER BLACK C5002 | SHIPMENT COMPLETED (2015/03/12 DELIVERY SCHEDULE) |
| 2015/03/12 | MP P TONER BLACK C5002 | SHIPMENT COMPLETED (2015/03/13 DELIVERY SCHEDULE) |

FIG.15

○ INFORMATION ON REGULAR VISIT ○
DATE AND TIME: JULY 16 (WED) AM
○ ○
WE APOLOGIZE FOR THE
INCONVENIENCE DURING
○ MAINTENANCE. ○
THANK YOU FOR YOUR PATIENCE.
○ ○

FIG.16

| APPARATUS ID | TWO SIDES UTILIZATION PROMOTING CONTENT | ABNORMAL STATE CONTENT | DELIVERY STATUS CONTENT | REGULAR VISIT CONTENT |
|---|---|---|---|---|
| 3C66-000001 | ryomen.jpg | kosyo.jpg | toner.jpg | ce.jpg |
| 3C66-000002 | ryomen.jpg | kosyo.jpg | toner.jpg | ce.jpg |
| 3C66-000003 | ryomen.jpg | kosyo.jpg | toner.jpg | ce.jpg |
| 3C66-000004 | ryomen.jpg | kosyo.jpg | toner.jpg | ce.jpg |

FIG.17

| CONTENT NAME | START TIME OF DISTRIBUTION | FINISH TIME OF DISTRIBUTION | STATE INFORMATION | ACQUISITION DESTINATION INFORMATION | SIZE INFORMATION |
|---|---|---|---|---|---|
| TWO SIDES UTILIZATION PROMOTING CONTENT | 2015/11/1 | 2015/11/30 | COPY/SCAN | https://contents.co.jp/ryomen.jpg | 100KB |
| ABNORMAL STATE CONTENT | 2015/12/1 | 2015/12/31 | LOGIN | https://contents.co.jp/kosyo.jpg | 50KB |
| DELIVERY STATUS CONTENT | 2015/11/1 | 2015/11/30 | COPY/SCAN | https://contents.co.jp/toner.jpg | 2GB |
| REGULAR VISIT CONTENT | 2015/11/1 | 2015/11/30 | COPY/SCAN | https://contents.co.jp/ce.jpg | 300KB |

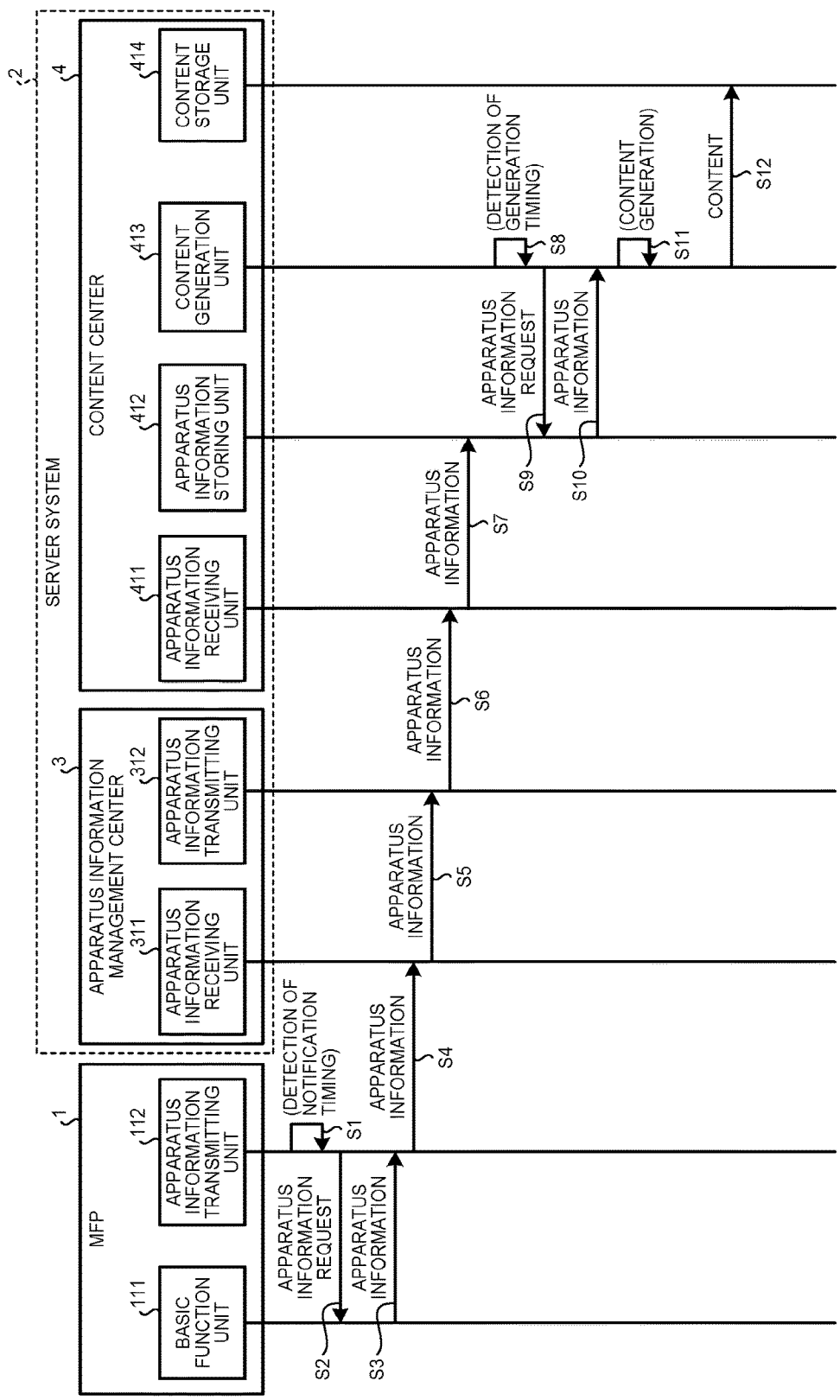

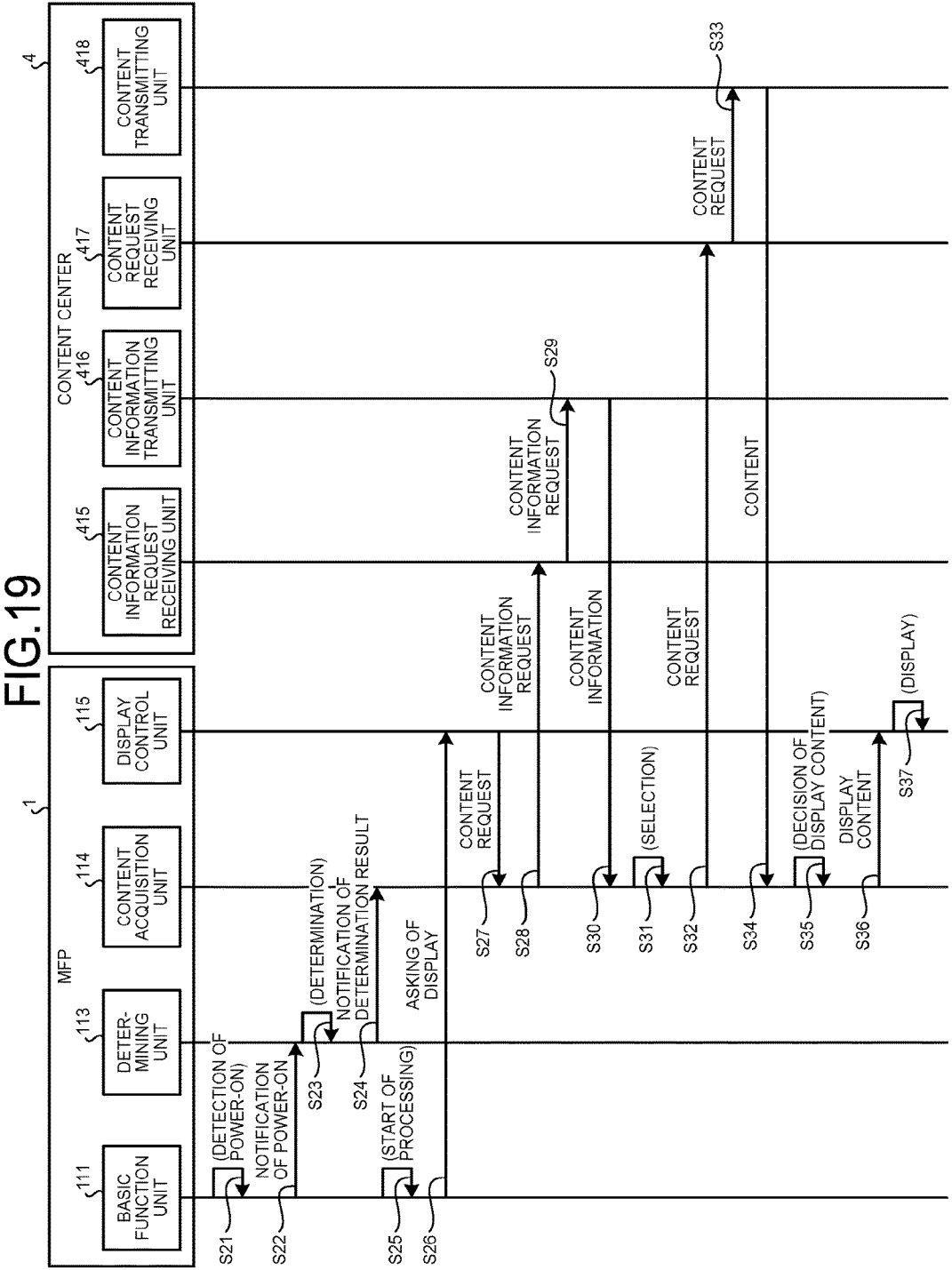

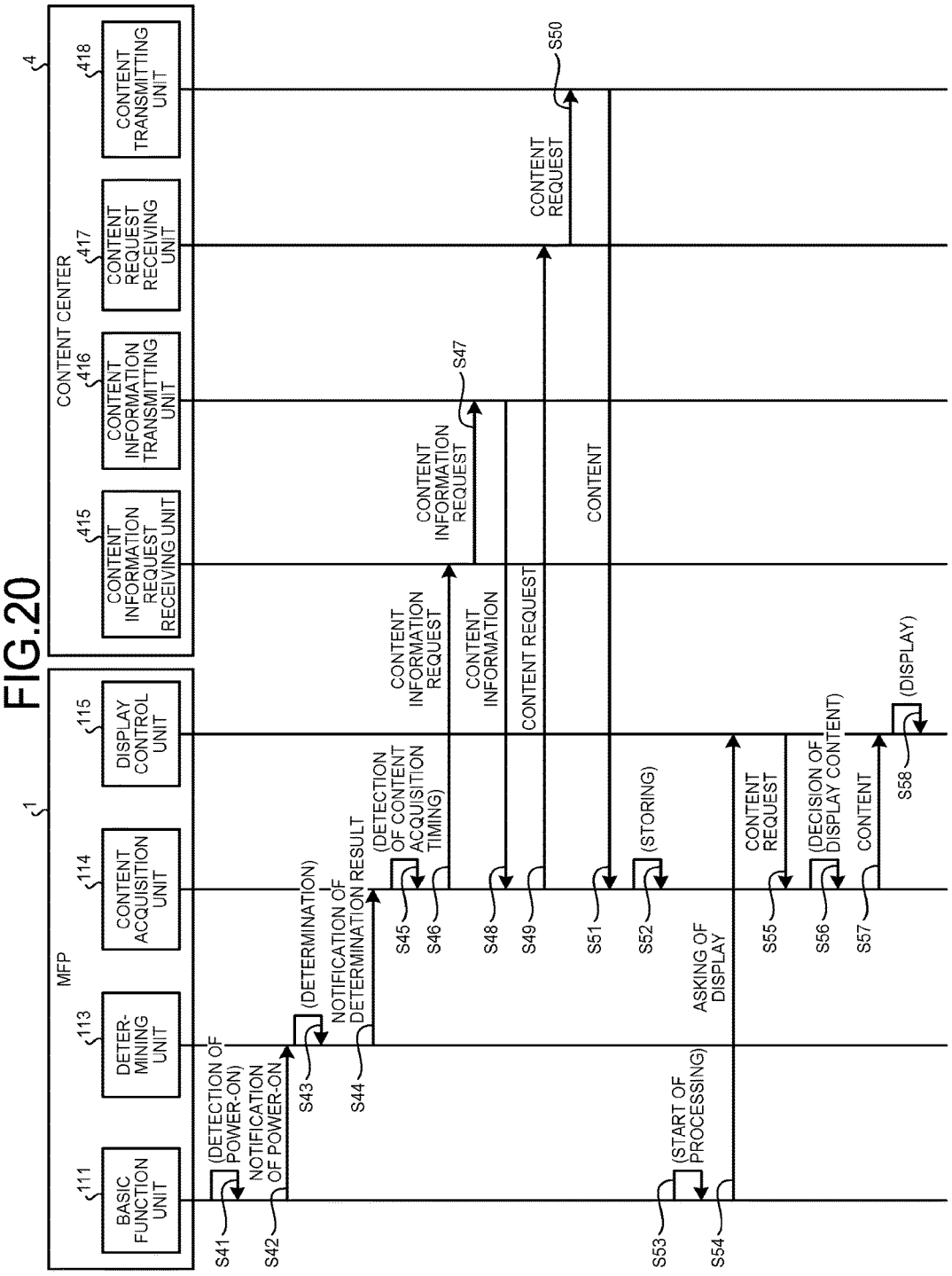

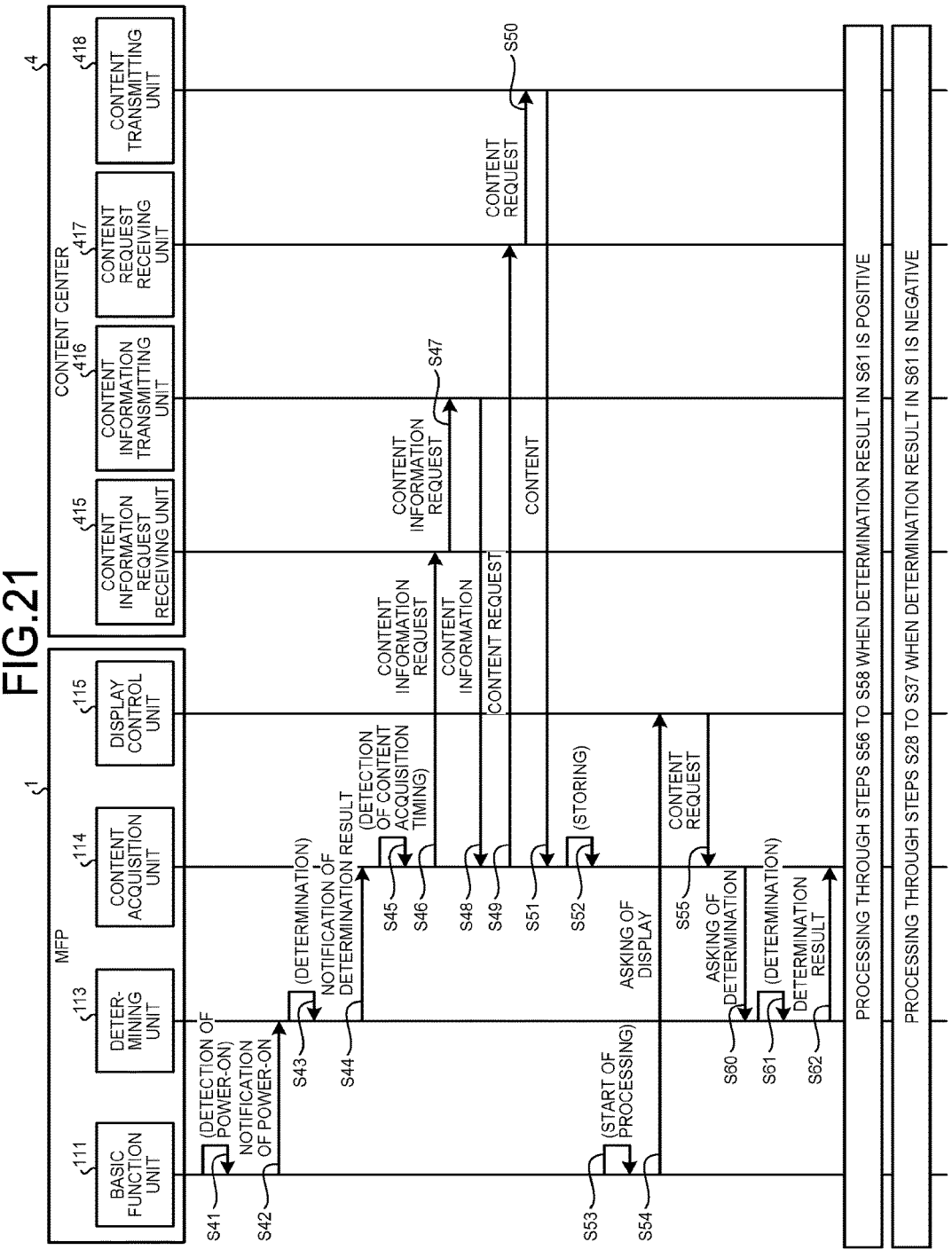

FIG.23

| APPARATUS ID | DATE AND TIME OF NOTIFICATION | UTILIZATION AMOUNT INFORMATION ||||  ABNORMALITY PRESENCE INFORMATION | CONNECTION INFORMATION | REMAINING AMOUNT INFORMATION |
| --- | --- | --- | --- | --- | --- | --- | --- | --- |
| | | TOTAL COUNTER | MONO-CHROME COUNTER | COLOR COUNTER | TWO SIDES COUNTER | PRESENCE OR ABSENCE OF ABNORMALITY | STORAGE DEVICE | TONER REMAINING AMOUNT |
| 3C66-000001 | 2015/11/6 9:00 | 100 | 50 | 50 | 10 | NORMAL | PRESENT | 90 |

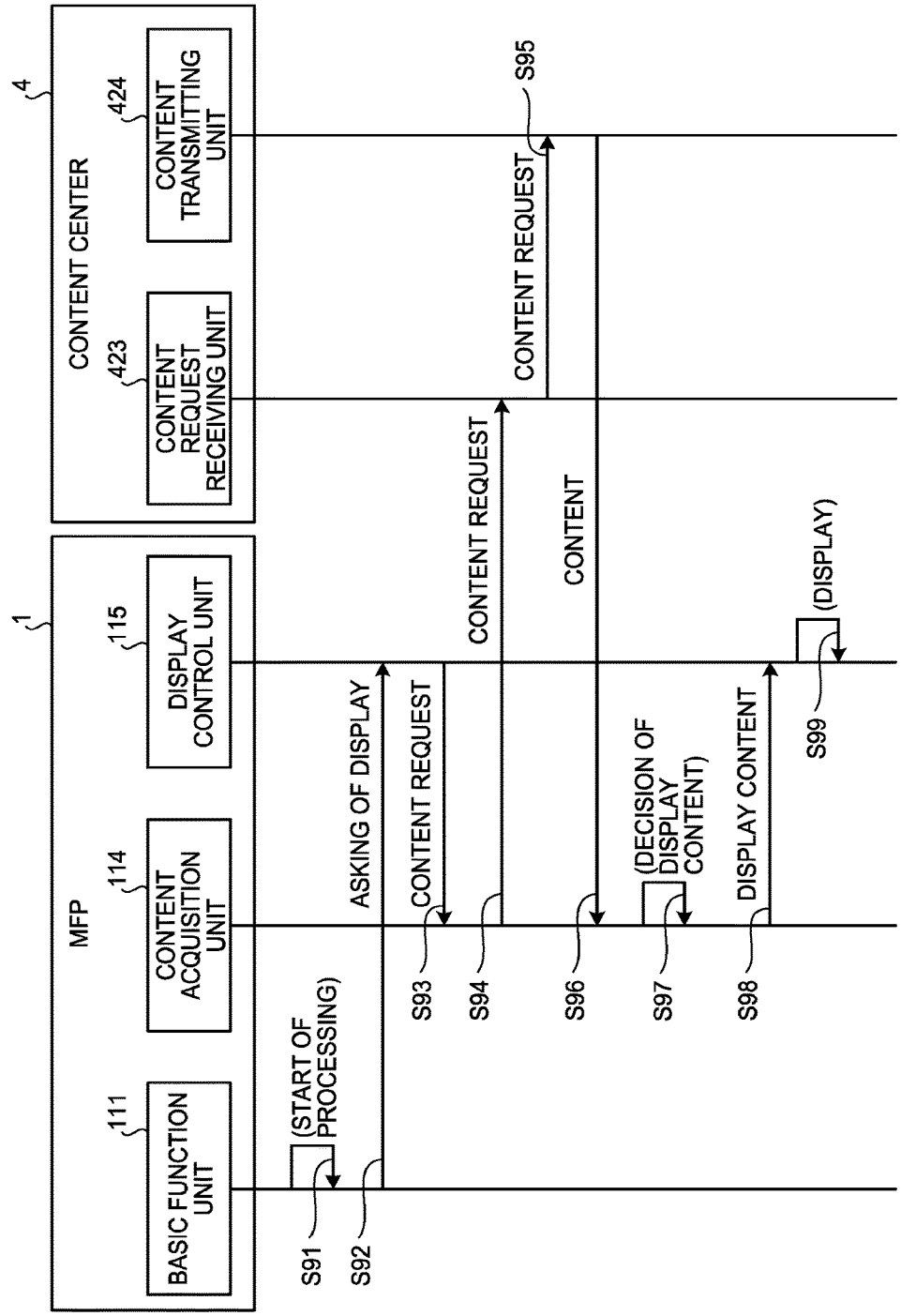

INFORMATION PROCESSING SYSTEM FOR DISTRIBUTING CONTENT IN RESPONSE TO A REQUEST

FIELD

The present invention relates to an information processing system, an apparatus, an information processing method, and a program.

BACKGROUND

Conventionally, a technique of distributing advertisement, announcement or the like by utilizing a signage system has been known.

For example, Patent Literature 1 discloses a technique of distributing a content, on which metadata for managing a function of an apparatus is recorded, to an apparatus that is the target of distribution.

SUMMARY

Technical Problem

However, even if a content is distributed using such a conventional technique, when an apparatus that is the target of distribution does not have a storage means that stores therein the received content, the apparatus may not be able to utilize the distributed content.

In view of the foregoing, an object of the present invention is to provide an information processing system, an apparatus, an information processing method, and a program that allow utilization of a content suitable for the configuration of an apparatus.

Solution to Problem

In order to solve the above problem and achieve the object, an information processing system includes an apparatus and a server system including one or more servers connectable with the apparatus via a network, the server system including: an apparatus information receiving unit configured to receive apparatus information indicating information related to the apparatus; a content generation unit configured to generate a content for indicating information to be conveyed to a user based on the apparatus information received by the apparatus information receiving unit; a content information request receiving unit configured to receive a content information request requesting content information indicating information capable of identifying the content from the apparatus; a content information transmitting unit configured to transmit, to the apparatus, the content information capable of identifying one or more contents generated by the content generation unit as a response to the content information request; a content request receiving unit configured to receive a content request requesting the content from the apparatus; and a content transmitting unit configured to transmit the content to the apparatus as a response to the content request, the apparatus including: an apparatus information transmitting unit configured to transmit the apparatus information to the server system; a content information request transmitting unit configured to transmit the content information request to the server system; a content information receiving unit configured to receive the content information from the server system as a response to the content information request; a selection unit configured to select a content satisfying a predetermined condition from among the one or more contents identified by the content information received by the content information receiving unit when a storage device is not connected to the apparatus; a content request transmitting unit configured to transmit the content request requesting the content selected by the selection unit to the server system; and a content receiving unit configured to receive the content from the server system as a response to the content request.

Advantageous Effects of Invention

According to the present invention, a content suitable for the configuration of an apparatus can be utilized.

BRIEF DESCRIPTION OF DRAWINGS

FIG. 5 is a figure illustrating an example of apparatus information.

FIG. 12 is a figure illustrating an example of information stored by an apparatus information storing unit.

FIG. 13 is a figure illustrating an example of an abnormal state content.

FIG. 14 is a figure illustrating an example of a delivery status content.

FIG. 15 is a figure illustrating an example of a regular visit content.

FIG. 16 is a figure illustrating an example of information stored in a content storage unit.

FIG. 17 is a figure illustrating an example of content information.

FIG. 18 is a sequence diagram illustrating an example of an operating procedure of an information processing system in the first embodiment.

FIG. 19 is a sequence diagram illustrating an example of an operating procedure of an information processing system in the first embodiment.

FIG. 20 is a sequence diagram illustrating an example of an operating procedure of an information processing system in the first embodiment.

FIG. 21 is a sequence diagram illustrating an example of an operating procedure of an information processing system in a modification example of the first embodiment.

FIG. 23 is a figure illustrating an example of apparatus information in the second embodiment.

FIG. 27 is a sequence diagram illustrating an example of an operating procedure of an information processing system in the second embodiment.

DESCRIPTION OF EMBODIMENTS

Hereinafter, embodiments of an information processing system, an apparatus, an information processing method, and a program defined according to the present invention will be explained in detail while referring to the attached drawings. The apparatus included in the information processing system defined by the present invention is explained below by using a multifunction peripheral (MFP: Multifunction Peripheral) as an example. However, the apparatus is not limited thereto. For example, the apparatus includes a camera, a projector, an interactive white board (electronic blackboard), a dedicated terminal of a video-conference/Web conference system, a digital signage, a production printer, a 3D printer, a facsimile and the like. Furthermore, the multifunction peripheral refers to a device having a plurality of different functions such as a copy function, a scanner function, a printer function, and a facsimile function.

[First Embodiment]

Figure 1:
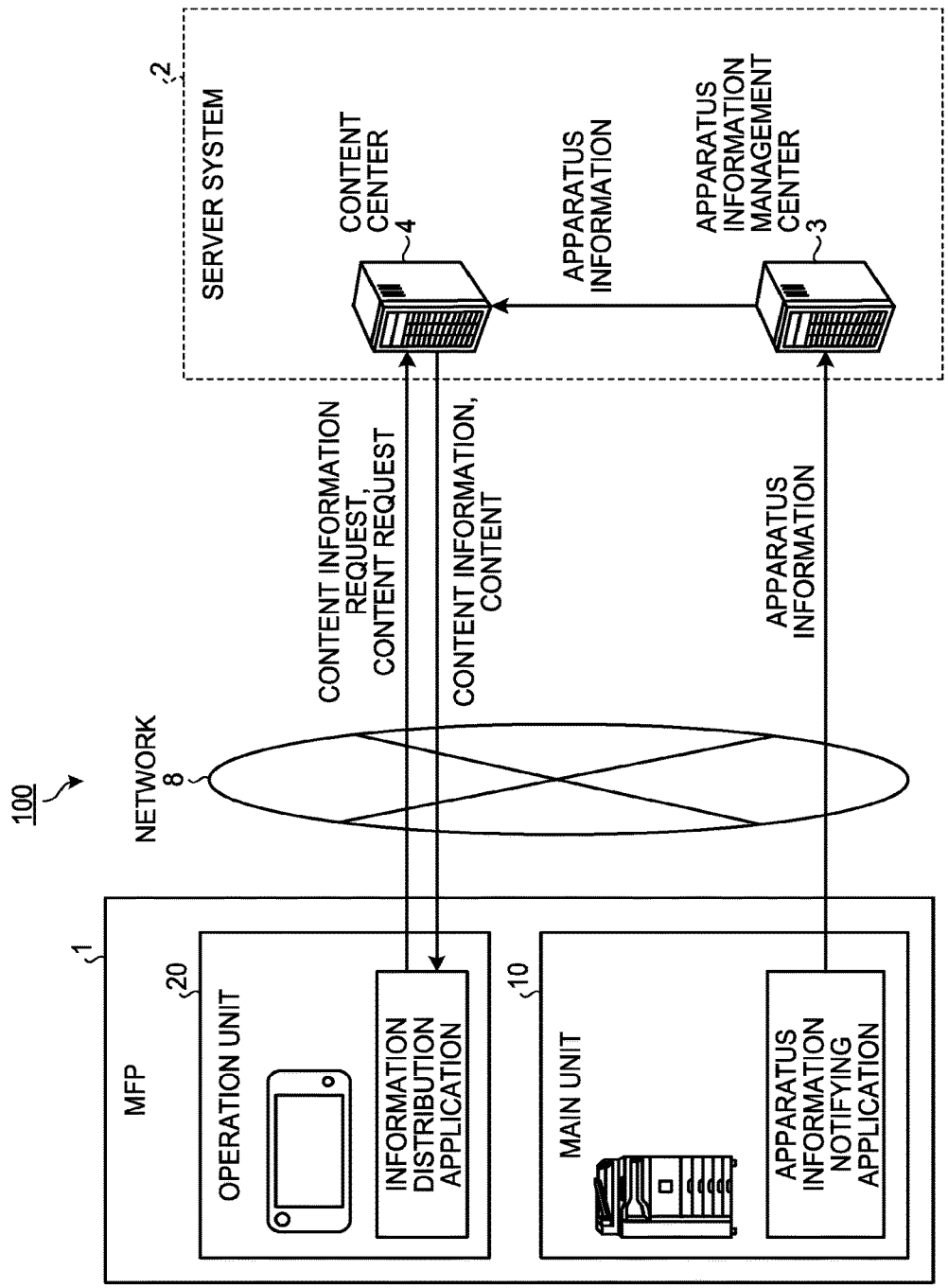
FIG. 1 is a figure illustrating an example of a configuration of an information processing system.

FIG. 1 is a figure illustrating an example of a configuration of an information processing system 100 in the present embodiment. As illustrated in FIG. 1, the information processing system 100 includes an MFP 1 and a server system 2, wherein these are interconnectable via a network 8 such as the Internet.

For convenience of explanation, the example in FIG. 1 exemplifies the single MFP 1 as an apparatus included in the information processing system 100. However, not limited to this, the number and type of apparatus included in the information processing system 100 are optional. In short, the information processing system 100 only needs to be in a form that includes one or more apparatuses.

The server system 2 has a function of distributing, to the MFP 1, a content for indicating information to be conveyed (reported) to a user. In this example, the server system 2 includes an apparatus information management center 3 and a content center 4. The apparatus information management center 3 receives apparatus information that will be mentioned later from the MFP 1, and transmits the received apparatus information to the content center 4. The content center 4 generates a content based on the apparatus information received from the apparatus information management center 3. While the specific detail will be mentioned later, once the content center 4 receives a content information request that will be mentioned later from the MFP 1, it transmits, to the MFP 1, content information that can identify one or more contents generated based on the apparatus information of the MFP 1 as a response to the received content information request. In addition, once the content center 4 receives a content request that will be mentioned later from the MFP 1, it transmits a content requested by the content request to the MFP 1 as a response to the received content request. The specific detail thereof will be mentioned later.

In addition, in this example, the MFP 1 includes a main unit 10 that can implement various functions such as a copy function, a scanner function, a facsimile function, and a printer function, and an operation unit 20 for accepting an operation by a user. In this example, an application (referred to as the "apparatus information notifying application") for providing a function to transmit apparatus information that will be mentioned later to the server system 2 (apparatus information management center 3) is installed on the main unit 10 in advance. In addition, an application (referred to as the "information distribution application") for providing a function to transmit a content information request or content request to the server system 2 (content center 4), and a function to display a content acquired from the server system 2, is installed on the operation unit 20 in advance. The specific detail of the MFP 1 will be mentioned later.

Figure 2:
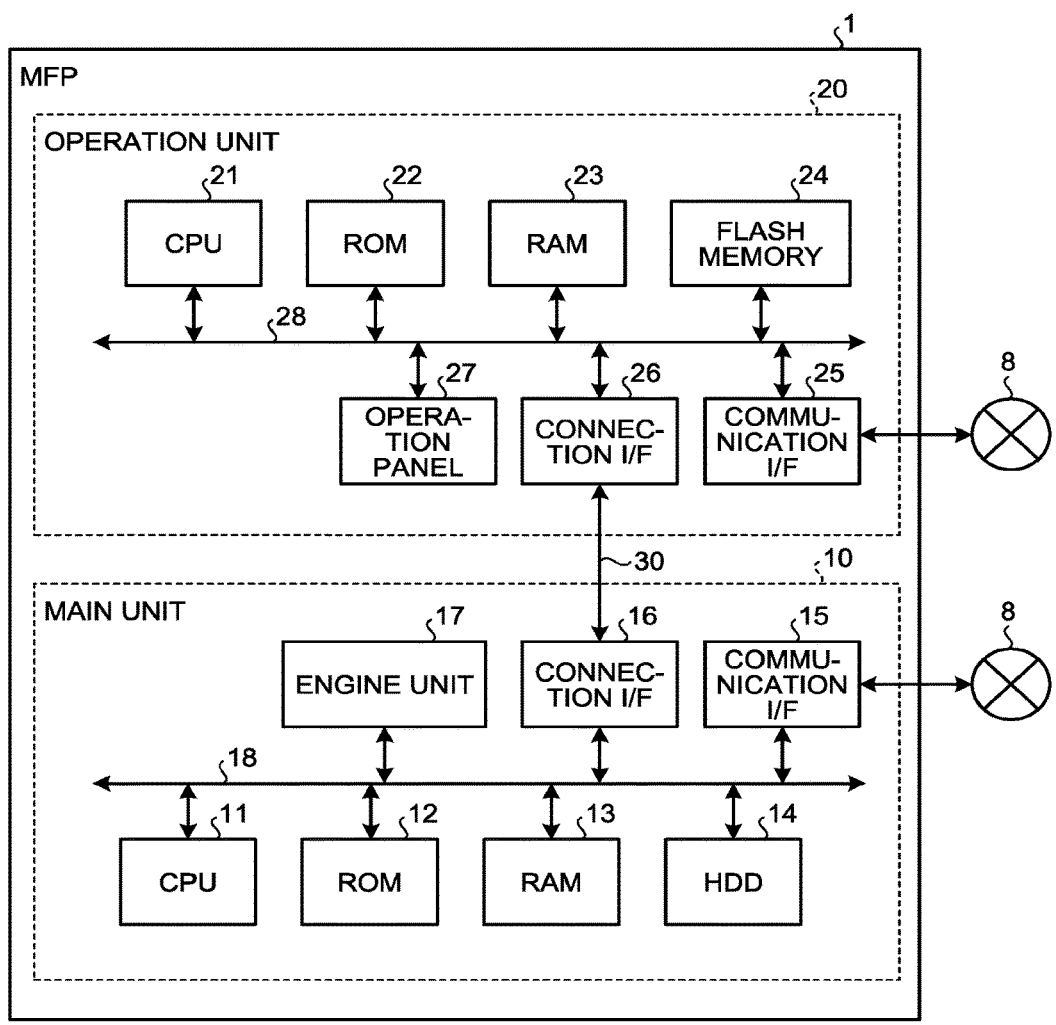
FIG. 2 is a figure illustrating an example of a hardware configuration of an MFP.

FIG. 2 is a figure illustrating an example of a hardware configuration of the MFP 1. As illustrated in FIG. 2, the MFP 1 includes the main unit 10 and the operation unit 20. The main unit 10 and the operation unit 20 are connected such that these can mutually communicate via a dedicated communication channel 30. Although the communication channel 30 to be used may have, for example, a universal serial bus (USB) standard, it may have an optional standard regardless of being wired or wireless.

Furthermore, the main unit 10 can perform an operation in accordance with an operation accepted by the operation unit 20. In addition, the main unit 10 can also communicate with an external device such as a client personal computer (PC), and it can perform an operation in accordance with an instruction received from the external device.

Next, a hardware configuration of the main unit 10 will be explained. As illustrated in FIG. 2, the main unit 10 includes a central processing unit (CPU) 11, a read only memory (ROM) 12, a random access memory (RAM) 13, a hard disk drive (HDD) 14, a communication interface (I/F) 15, a connection I/F 16, and an engine unit 17, wherein these are interconnected via a system bus 18. For convenience of explanation, the main unit 10 is explained in FIG. 2 by using a configuration having the HDD 14 as an example. However, for example, it may have a configuration that does not have the HDD 14, and is unable to reserve a sufficient storage area.

The CPU 11 integrally controls operations of the main unit 10. The CPU 11 controls the operations of the entire main unit 10 by executing a computer program stored in the ROM 12, HDD 14, or the like using the RAM 13 as a work area, and implement various functions such as the aforementioned copy function, scanner function, facsimile function, and printer function.

The communication I/F 15 is an interface for connection with the network 8. The connection I/F 16 is an interface for communication with the operation unit 20 via the communication channel 30.

The engine unit 17 is hardware that performs versatile information processing and processing other than communication, for implementing the copy function, scanner function, facsimile function, and printer function. For example, it can include a scanner (image reading unit) for scanning and reading an image of a document, a plotter (image forming unit) for performing printing on a sheet material such as a paper, a facsimile unit that performs facsimile communication, and the like. Furthermore, it can also include specific options such as a finisher for sorting printed sheet materials and an auto document feeder (ADF) for automatically feeding a document.

Next, a hardware configuration of the operation unit 20 will be explained. As illustrated in FIG. 2, the operation unit 20 includes a CPU 21, a ROM 22, a RAM 23, a flash memory 24, a communication I/F 25, a connection I/F 26, and an operation panel 27, wherein these are interconnected via a system bus 28. For convenience of explanation, the operation unit 20 is explained in FIG. 2 by using a configuration having the flash memory 24 as an example. However, for example, it may also have a configuration that does not have the flash memory 24. In short, the MFP 1 may also have a configuration that does not have a storage device for storing a received content.

The CPU 21 integrally controls operations of the operation unit 20. The CPU 21 controls the operations of the entire operation unit 20 by executing a computer program stored in the ROM 22, flash memory 24, or the like using the RAM 23 as a work area, and implements various functions that will be mentioned later such as a display of information (image) in accordance with an accepted input from a user.

The communication I/F 25 is an interface for connection with the network 8. The connection I/F 26 is an interface for communication with the main unit 10 via the communication channel 30.

The operation panel 27 accepts various inputs in accordance with operations by a user, and displays various types of information (for example, information in accordance with the accepted input, information indicating the operating status of the MFP 1, information indicating the setting state, and the like). In this example, the operation panel 27 is composed of a liquid crystal display device (LCD) equipped with a touch panel function, but is not limited thereto. For example, it may be composed of an organic EL display device equipped with a touch panel function. Furthermore, in addition to this or instead of this, an operation unit such as a hardware key or a display unit such as a lamp may also be provided.

Figure 3:
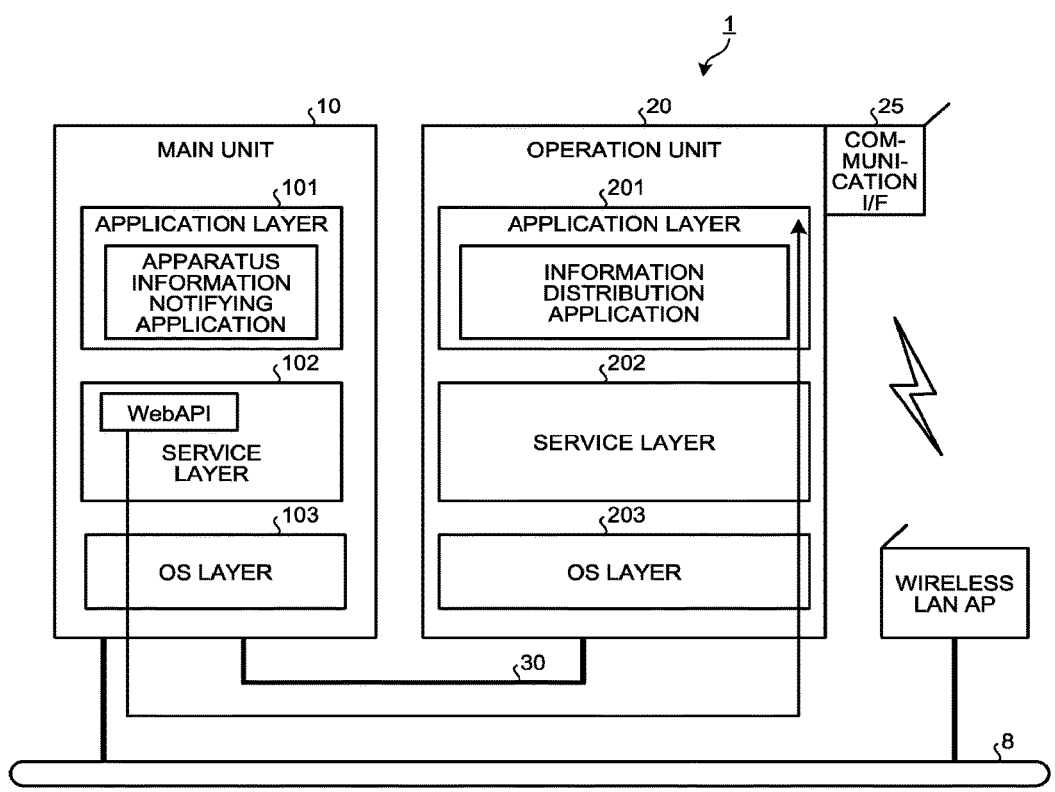
FIG. 3 is a figure illustrating an example of a software configuration of an MFP.

Next, a software configuration of the MFP 1 will be explained. FIG. 3 is a schematic diagram illustrating an example of a software configuration of the MFP 1. As illustrated in FIG. 3, the main unit 10 has an application layer 101, a service layer 102, and an operating system (OS) layer 103. The substance of the application layer 101, service layer 102, and the OS layer 103 is various pieces of software stored in the ROM 12, HDD 14, or the like. Various functions are provided by the execution of such software by the CPU 11.

The software of the application layer 101 is application software (in the explanation below, may be merely referred to as the "application") for operating a hardware resource to provide a predetermined function. For example, the application includes a copy application for providing a copy function, a scanner application for providing a scanner function, a facsimile application for providing a facsimile function, a printer application for providing a printer function, an apparatus information notifying application, and the like.

The software of the service layer 102 is interposed between the application layer 101 and the OS layer 103, and this software is for providing an interface to utilize the hardware resources provided in the main unit 10, to the application. More specifically, this software is for providing functions to perform acceptance of an operation request for a hardware resource and arbitration of an operation request. A request such as reading by a scanner or printing by a plotter can be conceived as the operation request to be accepted by the service layer 102.

Furthermore, the function of the interface by the service layer 102 is provided not only for the application layer 101 of the main unit 10, but also for an application layer 201 of the operation unit 20. Specifically, the application layer 201 (application) of the operation unit 20 is also able to implement the functions utilizing the hardware resources (for example, the engine unit 17) of the main unit 10 via the interface function of the service layer 102. For example, the interface function of the service layer 102 is provided with a Web API. The operation unit 20 and the main unit 10 can communicate by using the communication channel 30 as the network.

The software of the OS layer 103 is basic software (operating system (OS)) for providing basic functions to control the hardware provided in the main unit 10. The software of the service layer 102 converts utilization requests for the hardware resources from various applications into commands interpretable by the OS layer 103, and passes these to the OS layer 103. Furthermore, the hardware resources perform operations complying with the requests from the applications by the execution of the commands by the software of the OS layer 103.

Similarly, the operation unit 20 has the application layer 201, a service layer 202, and an OS layer 203. The application layer 201, the service layer 202, and the OS layer 203 provided in the operation unit 20 also have a hierarchical structure that is the same as that on the main unit 10 side. However, the functions to be provided by the applications of the application layer 201 and the types of operation requests acceptable by the service layer 202 are different from those on the main unit 10 side. Although the applications of the application layer 201 may be software for providing predetermined functions by operating the hardware resources provided in the operation unit 20, the applications are mainly software for providing user interface (UI) functions (the UI function of a copy, the UI function of a scanner, the UI function of facsimile, the UI function of a printer, the UI function of an initial setting, and the like) and browser functions to perform operations and displays related to the functions (copy function, scanner function, facsimile function, printer function, and initial setting function) provided in the main unit 10. In this example, the applications of the application layer 201 include the information distribution application and the like.

Furthermore, in the present embodiment, the software of the OS layer 103 on the main unit 10 side and the software of the OS layer 203 on the operation unit 20 side are different from each other to maintain independence of the functions. In other words, the main unit 10 and the operation unit 20 operate independently of each other with separate operating systems. For example, it is possible to use NetBSD (trademark) as the software of the OS layer 103 on the main unit 10 side, and Android (trademark) as the software of the OS layer 203 on the operation unit 20 side.

As described above, since the main unit 10 and the operation unit 20 operate with separate operating systems in the MFP 1 in the present embodiment, the communication between the main unit 10 and the operation unit 20 is performed not as communication between processes within a common device, but as communication between different devices. An operation (command communication) to convey information (details of instructions from users) accepted by the operation unit 20 to the main unit 10, an operation of the main unit 10 to give a notice of an event to the operation unit 20, and the like fall under such communication. In the present embodiment, the functions of the main unit 10 can be used by the command communication of the operation unit 20 with the main unit 10. In addition, the event notified from the main unit 10 to the operation unit 20 includes the execution status of the operation in the main unit 10, the detail set on the main unit 10 side, and the like.

In addition, in the present embodiment, electricity supply to the operation unit 20 is performed from the main unit 10 through the communication channel 30. Thus, the power-supply control of the operation unit 20 can be performed separately from (independently of) the power-supply control of the main unit 10.

Figure 4:
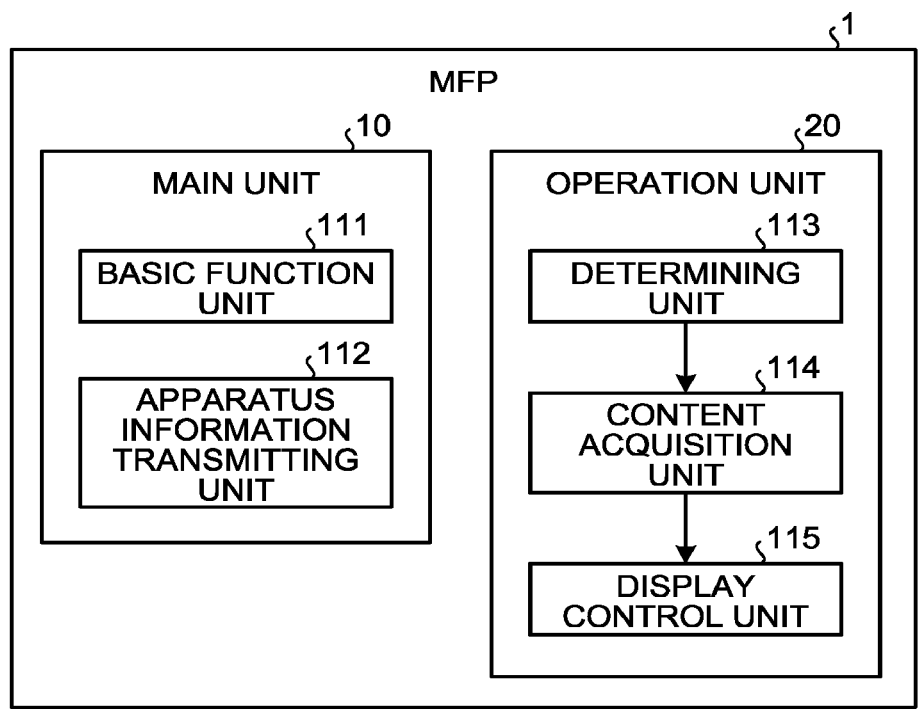
FIG. 4 is a figure illustrating an example of a function possessed by an MFP.

Next, a function possessed by the MFP 1 will be explained. FIG. 4 is a figure illustrating an example of a function possessed by the MFP 1. As illustrated in FIG. 4, the main unit 10 has a basic function unit 111 and an apparatus information transmitting unit 112. The operation unit 20 has a determining unit 113, a content acquisition unit 114, and a display control unit 115. For convenience of explanation, FIG. 4 mainly exemplifies functions related to the present embodiment. However, the functions possessed by the MFP 1 are not limited thereto.

The basic function unit 111 provides basic functions such as the copy function, the scanner function, and the like possessed by the MFP 1. In this example, the basic function unit 111 is a function implemented by the main unit 10.

The apparatus information transmitting unit 112 transmits apparatus information indicating information related to the MFP 1 (apparatus) to the server system 2. In this example, the apparatus information transmitting unit 112 regularly transmits the apparatus information to the apparatus information management center 3. The apparatus information contains information that is needed to generate a content.

FIG. 5 is a figure illustrating an example of apparatus information. In this example, the apparatus information contains an apparatus ID for identifying the MFP 1, date and time of notification of the apparatus information, utilization amount information indicating the utilization amount of the functions possessed by the MFP 1, abnormality presence information indicating whether there is an abnormality in the MFP 1, and remaining amount information indicating the remaining amounts of consumables (in this example, a toner) of the MFP 1. In the example of FIG. 5, the utilization amount information contains, but is not limited to, a total counter indicating the total of a count value indicating the number of times of utilization of black and white printing and a count value indicating the number of times of utilization of color printing, a monochrome counter indicating a count value of black and white printing, a color counter indicating a count value of color printing, and a two sides counter indicating a count value of two-sided printing. Other than these, information indicating the power state, the number of times of utilization of applications, and the like may be contained in the apparatus information. In addition, the abnormality presence information in this example indicates whether there is an abnormality in the MFP 1, and when the MFP 1 has an abnormality, it also indicates information related to the abnormality. In addition, the remaining amount information in this example indicates the remaining amount of a toner.

In this example, the function of the apparatus information transmitting unit 112 is implemented by the combination of the CPU 11, which executes the apparatus information notifying application, and the communication I/F 15. More specifically, the CPU 11 controls the communication I/F 15 such that the apparatus information is transmitted to the apparatus information management center 3.

Figure 6:
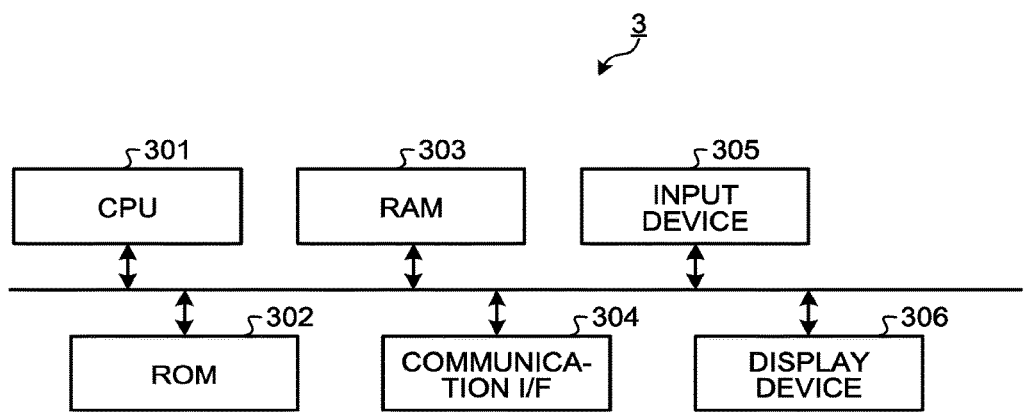
FIG. 6 is a figure illustrating an example of a hardware configuration of an apparatus information management center.

In this regard, the configuration of the apparatus information management center 3, which is the destination of the above-described apparatus information, will be explained. FIG. 6 is a figure illustrating an example of a hardware configuration of the apparatus information management center 3. As illustrated in FIG. 6, the apparatus information management center 3 includes a CPU 301, a ROM 302, a RAM 303, a communication I/F 304, an input device 305, and a display device 306. The CPU 301 integrally controls operations of the apparatus information management center 3. The ROM 302 is a nonvolatile memory for storing various types of data such as computer programs. The RAM 303 is a volatile memory that functions as a work area of various types of processing executed by the CPU 301. The communication I/F 304 is an interface for connection with the network 8. The input device 305 is a device that is used for an input of an operation by a user, and it is composed of, for example, a mouse, a keyboard, and the like. The display device 306 is a device for displaying various types of information, and it is composed of, for example, a liquid crystal display device and the like.

Figure 7:
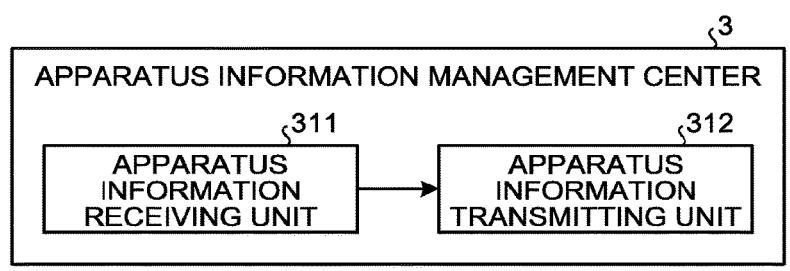
FIG. 7 is a figure illustrating an example of a function possessed by an apparatus information management center.

FIG. 7 is a figure illustrating an example of a function possessed by the apparatus information management center 3. As illustrated in FIG. 7, the apparatus information management center 3 has an apparatus information receiving unit 311 and an apparatus information transmitting unit 312. The apparatus information receiving unit 311 regularly receives the above-described apparatus information from the MFP 1. Every time the apparatus information receiving unit 311 receives apparatus information, the apparatus information transmitting unit 312 transmits the received apparatus information to the content center 4. In this example, the function of the apparatus information receiving unit 311 is implemented by the combination of the CPU 301 and the communication I/F 304. More specifically, the communication I/F 304 passes the apparatus information received from the MFP 1 to the CPU 301. In other words, the CPU 301 receives the apparatus information via the communication I/F 304. In addition, the function of the apparatus information transmitting unit 312 is implemented by the combination of the CPU 301 and the communication I/F 304. More specifically, the CPU 301 controls the communication I/F 304 such that the apparatus information is transmitted to the content center 4.

Returning to FIG. 4, the explanation of the function possessed by the MFP 1 will be continued. The determining unit 113 determines whether a storage device (for example, a readable and writable nonvolatile storage device such as an HDD or a flash memory) for storing a content received from the server system 2 is connected to the MFP 1. This nonvolatile storage device (storage device for storing a content) is a storage device different from a ROM or the like that stores therein computer programs and data to be processed, and it is also a storage device having larger storage capacity compared to a ROM or the like. Furthermore, the nonvolatile storage device includes magnetoresistive random access memory (MRAM), nonvolatile RAM (NVRAM), ferroelectric random access memory (FeRAM), and the like besides an HDD and a flash memory. In short, the nonvolatile storage device only needs to be a high-capacity storage device for storing contents. The function of the determining unit 113 is implemented by the execution of the information distribution application by the CPU 21. However, not limited to this, the function of the determining unit 113 may be implemented by, for example, a dedicated hardware circuit.

The content acquisition unit 114 acquires a content from the server system 2. In the present embodiment, the content acquisition unit 114 switches the acquisition method of a content depending on the determination result of the determining unit 113. The specific detail will be made clear by explanations using a sequence diagram that will be mentioned later. In this example, the function of the content acquisition unit 114 is implemented by the execution of the information distribution application by the CPU 21. However, not limited to this, at least a part of the function of the content acquisition unit 114 may be implemented by, for example, a dedicated hardware circuit.

Figure 8:
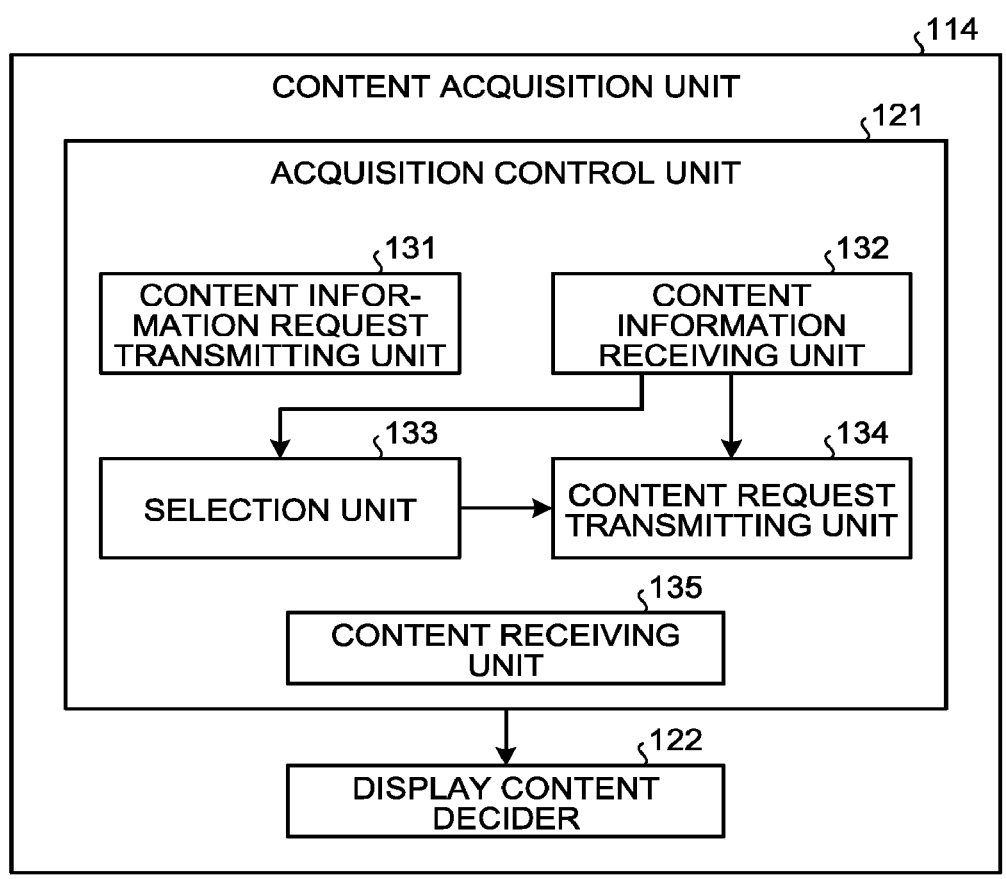
FIG. 8 is a figure illustrating an example of a detailed function of a content acquisition unit possessed by an MFP.

FIG. 8 is a figure illustrating an example of a detailed function of the content acquisition unit 114. As illustrated in FIG. 8, the content acquisition unit 114 has an acquisition control unit 121 and a display content decider 122. The acquisition control unit 121 contains a content information request transmitting unit 131, a content information receiving unit 132, a selection unit 133, a content request transmitting unit 134, and a content receiving unit 135. The content information request transmitting unit 131 transmits, to the content center 4, a content information request requesting content information indicating information that can identify a content (the substance of the content is not contained). In this example, the content information request contains at least the apparatus ID of the MFP 1. Furthermore, the timing of transmitting the above-described content information request changes depending on the determination result of the determining unit 113. A specific example thereof will be mentioned later. In this example, the function of the content information request transmitting unit 131 is implemented by the combination of the CPU 21, which executes the information distribution application, and the communication I/F 25.

Figure 9:
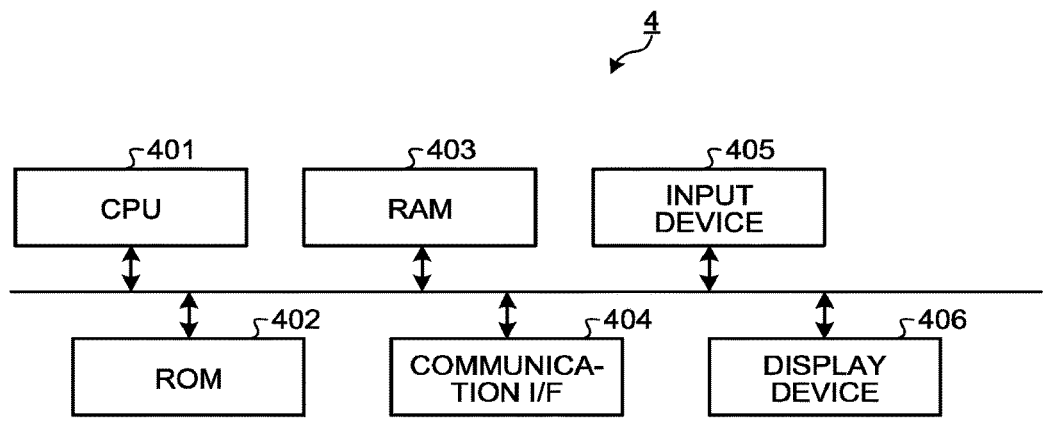
FIG. 9 is a figure illustrating an example of a hardware configuration of a content center.

In this regard, the configuration of the content center 4, which is the destination of the content information request, will be explained. FIG. 9 is a figure illustrating an example of a hardware configuration of the content center 4. As illustrated in FIG. 9, the content center 4 includes a CPU 401, a ROM 402, a RAM 403, a communication I/F 404, an input device 405, and a display device 406. The CPU 401 integrally controls operations of the content center 4. The ROM 402 is a nonvolatile memory for storing various types of data such as computer programs. The RAM 403 is a volatile memory that functions as a work area of various types of processing executed by the CPU 401. The communication I/F 404 is an interface for connection with the network 8. The input device 405 is a device that is used for an input of an operation by a user, and it is composed of, for example, a mouse, a keyboard, and the like. The display device 406 is a device for displaying various types of information, and it is composed of, for example, a liquid crystal display device and the like.

Figure 10:
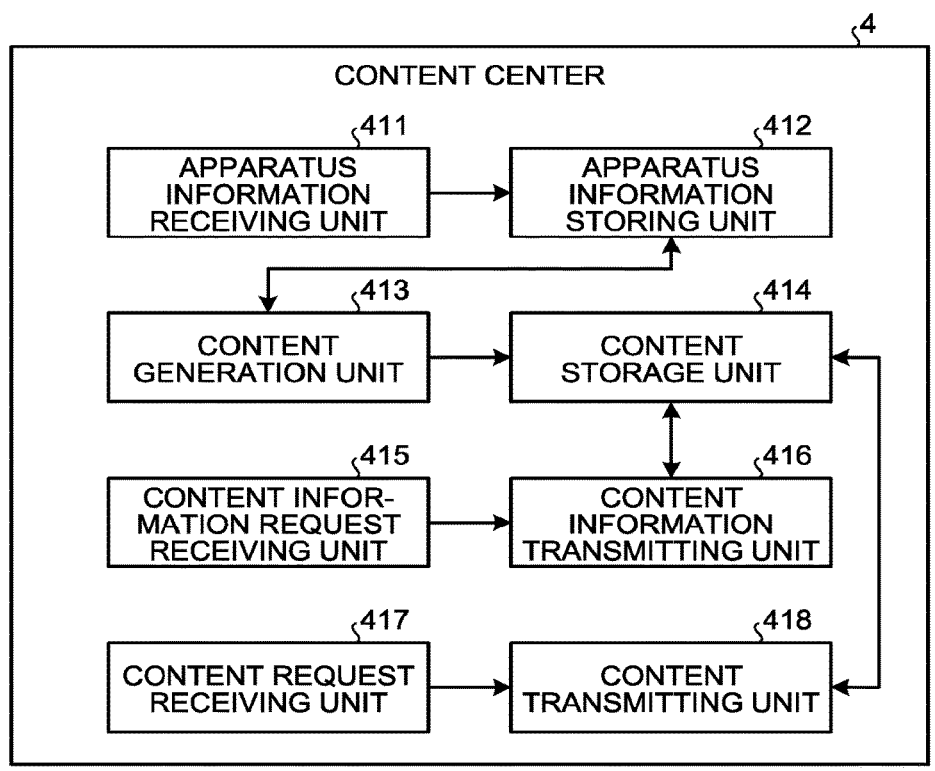
FIG. 10 is a figure illustrating an example of a function possessed by a content center.

FIG. 10 is a figure illustrating an example of a function possessed by the content center 4. As illustrated in FIG. 10, the content center 4 has an apparatus information receiving unit 411, an apparatus information storing unit 412, a content generation unit 413, a content storage unit 414, a content information request receiving unit 415, a content information transmitting unit 416, a content request receiving unit 417, and a content transmitting unit 418.

The apparatus information receiving unit 411 receives apparatus information from the apparatus information management center 3. In this example, the function of the apparatus information receiving unit 411 is implemented by the combination of the CPU 401 and the communication I/F 404.

The apparatus information storing unit 412 stores the apparatus information received by the apparatus information receiving unit 411. The apparatus information storing unit 412 is implemented by, for example, an auxiliary storage device such as an HDD connected to the ROM 402 and the content center 4.

The content generation unit 413 generates a content based on the apparatus information received by the apparatus information receiving unit 411. As mentioned above, in this example, the apparatus information contains at least the utilization amount information, the abnormality presence information, and the remaining amount information.

Figure 11:
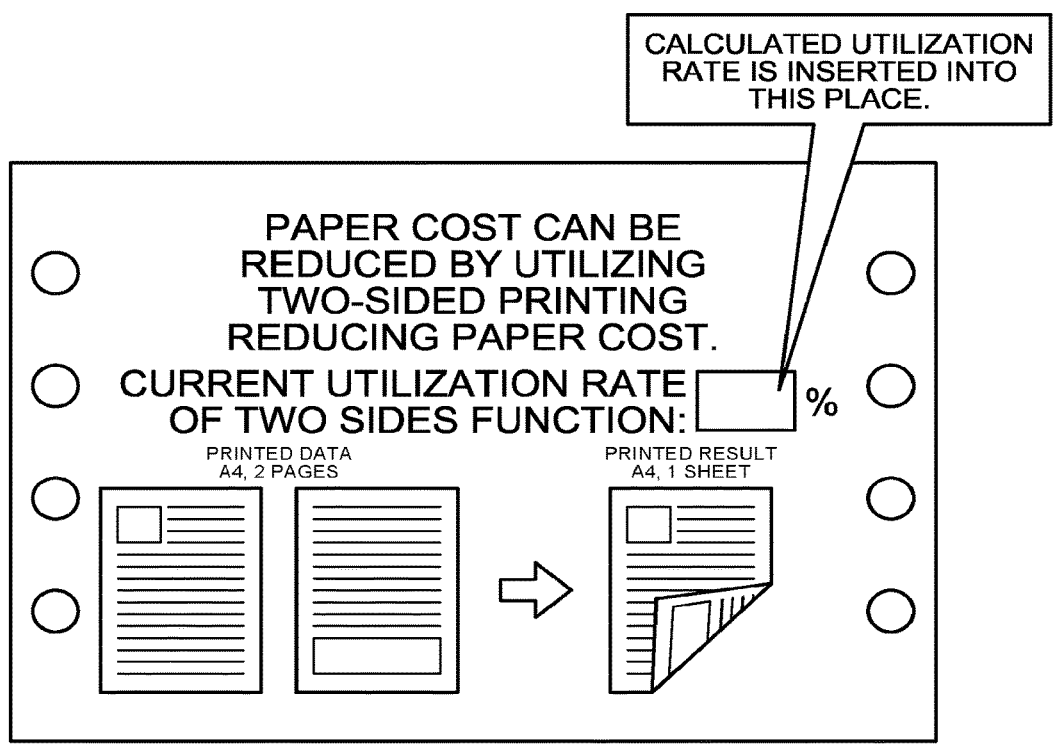
FIG. 11 is a figure illustrating an example of a two sides utilization promoting content.

The content generation unit 413 generates a content for indicating the trends in use of the function possessed by the MFP 1, by using the utilization amount information. For example, a case in which the content generation unit 413 generates a content for indicating the trends in use of the two-sided printing function possessed by the MFP 1 is presumed. In this case, among the pieces of information contained in the utilization amount information, the content generation unit 413 uses the total counter and the two sides counter to calculate the utilization rate of the two-sided printing function. For example, when the total counter is "100" and the two sides counter is "10", the utilization rate of the two-sided printing function can be calculated as "10%". Furthermore, by inserting the calculated utilization rate of the two-sided printing function into a predetermined region (region displaying the utilization rate of the two-sided printing function) in a template image as illustrated in FIG. 11, a content (in the explanation below, may be referred to as the "two sides utilization promoting content") indicating the trends in use of the two-sided printing function can be generated. Furthermore, for example, when generating only the content for indicating the trends in use of the two-sided printing function as the content for indicating the trends in use of the functions possessed by the MFP 1, other pieces of information (the monochrome counter and the color counter) contained in the utilization amount information would become unnecessary. Thus, as illustrated in FIG. 12, among the pieces of information contained in the utilization amount information, the apparatus information storing unit 412 can store only the pieces of information (in this example, the total counter and the two sides counter) needed to generate the two sides utilization promoting content. In other words, the apparatus information storing unit 412 may be in a form that stores only the information needed to generate one or more predetermined contents among the pieces of information contained in the apparatus information received by the apparatus information receiving unit 411, as the apparatus information. Furthermore, the apparatus information storing unit 412 may be in a form that stores the apparatus information received by the apparatus information receiving unit 411 as it is.

In addition, when the abnormality presence information contained in the apparatus information indicates that the MFP 1 has an abnormality, and also indicates information related to the abnormality (for example, information indicating the cause of the abnormality, the place where the abnormality has occurred, and the like), the content generation unit 413 can generate a content (in the explanation below, may be referred to as the "abnormal state content") indicating the dispatch of a responder (serviceman) and information related to the abnormality (in the example of FIG. 13, information indicating that the cause of the abnormality is occurrence of paper jam) as illustrated in FIG. 13, for example.

In addition, when the remaining amount indicated by the remaining amount information contained in the apparatus information is equal to or lower than a threshold (for example, 10%), the content generation unit 413 can generate a content (in the explanation below, may be referred to as the "delivery status content") indicating the delivery status of consumables as illustrated in FIG. 14 for example.

Moreover, for example, for each apparatus ID contained in the apparatus information, the content generation unit 413 can also generate a content (in the explanation below, may be referred to as the "regular visit content") for informing date and time of regular visit of a serviceman, as illustrated in FIG. 15.

The function of the content generation unit 413 mentioned above is implemented by the execution of a computer program stored in a storage device such as the ROM 402 by the CPU 401. However, not limited to this, it may be implemented by, for example, a dedicated hardware circuit.

The explanation of FIG. 10 will be continued. The content storage unit 414 stores therein the content generated by the content generation unit 413. FIG. 16 is a figure illustrating an example of information stored in the content storage unit 414. In the example of FIG. 16, the two sides utilization promoting content, the abnormal state content, the delivery status content and the regular visit content are linked for each apparatus ID. The content storage unit 414 is implemented by, for example, an auxiliary storage device such as an HDD connected to the ROM 402 and the content center 4.

The explanation of FIG. 10 will be continued. The content information request receiving unit 415 receives the aforementioned content information request from the MFP 1. In this example, the function of the content information request receiving unit 415 is implemented by the combination of the CPU 401 and the communication I/F 404.

The content information transmitting unit 416 transmits, to the MFP 1, content information indicating information that can identify one or more contents generated by the content generation unit 413 (the substance of the content is not contained) as a response to the content information request received by the content information request receiving unit 415. As mentioned above, in this example, the content information request contains the apparatus ID of the MFP 1. Thus, the content information transmitting unit 416 reads, from the content storage unit 414, the contents (two sides utilization promoting content, abnormal state content, delivery status content, and regular visit content) linked to the apparatus ID contained in the content information request received by the content information request receiving unit 415. Furthermore, the content information transmitting unit 416 transmits, to the MFP 1, content information that can identify the read content. In this example, the function of the content information transmitting unit 416 is implemented by the combination of the CPU 401 and the communication I/F 404.

The content information in the present embodiment is information in which each piece of content identification information for identifying a content is associated with at least size information for identifying the data size of the content and state information for identifying the state of the MFP 1 that corresponds to the timing of displaying the content. FIG. 17 is a figure illustrating an example of the content information. In the example of FIG. 17, the content information is information in which each content name indicating the name of a content (an example of the content identification information) is associated with the start time of distribution, the finish time of distribution, the state information, acquisition destination information indicating the acquisition destination of the content (an example of the "storage location information"; in this example, a URL that can identify the storage location of the content) and size information. However, the content information is not limited thereto. For example, the size information only needs to be information that can identify the data size. For example, it may be a value itself representing the size, or may be information indicating the file format. This is because a needed data size can be understood once the file format is understood. However, the content information does not contain the substance of the content. In addition, the state information can also be regarded as information indicating the operation of the MFP 1 or the operation of the user that is the timing of displaying the content. In the example of FIG. 17, the state information identifying "copy" means that the display timing of a content is when a user operation instructing the execution of copy is accepted by the operation unit 20, or when the MFP 1 starts copy processing. In addition, the state information identifying "scan" means that the display timing of a content is when a user operation instructing the execution of a scan is accepted by the operation unit 20, or when the MFP 1 starts scan processing. In addition, the state information identifying "login" means that the display timing of a content is when a user starts the operation of login processing on the operation unit 20, or when the MFP 1 starts login processing.

The explanation of FIG. 10 will be continued. The content request receiving unit 417 receives a content request that will be mentioned later from the MFP 1. In this example, the function of the content request receiving unit 417 is implemented by the combination of the CPU 401 and the communication I/F 404. The content transmitting unit 418 transmits a content to the MFP 1 as a response to the content request received by the content request receiving unit 417. More specifically, the content transmitting unit 418 reads one or more contents requested by the content request from the content storage unit 414, and transmits the read one or more contents to the MFP 1. In this example, the function of the content transmitting unit 418 is implemented by the combination of the CPU 401 and the communication I/F 404.

Returning to FIG. 8, the explanation of the detailed function of the content acquisition unit 114 in the MFP 1 will be continued. The content information receiving unit 132 included in the content acquisition unit 114 receives content information from the content center 4 as a response to the content information request. In this example, when the determination result of the determining unit 113 is positive (when it is determined that a storage device is connected to the MFP 1), the content information receiving unit 132 passes the received content information to the content request transmitting unit 134 as it is. On the other hand, when the determination result of the determining unit 113 is negative (when it is determined that the storage device is not connected to the MFP 1), the content information receiving unit 132 passes the received content information to the selection unit 133. The specific detail will be made clear by the explanation of a sequence diagram that will be mentioned later. Furthermore, in this example, the function of the content information receiving unit 132 is implemented by the combination of the CPU 21 and the communication I/F 25.

When the storage device (storage device that stores therein a content) is not connected to the MFP 1 (when the determination result of the determining unit 113 is negative), the selection unit 133 selects a content satisfying a predetermined condition from among one or more contents identified by the content information received by the content information receiving unit 132. In the present embodiment, the above-described predetermined condition indicates that the data size of the content is equal to or lower than a threshold. Thus, the selection unit 133 selects a content having a data size that is equal to or lower than the threshold from among the one or more contents identified by the content information received by the content information receiving unit 132. Furthermore, when the storage device is connected to the MFP 1 (when the determination result of the determining unit 113 is positive), the content information received by the content information receiving unit 132 will not be input to the selection unit 133. Thus, a selection by the selection unit 133 will not be performed.

In the present embodiment, when the storage device (such as an HDD) is not connected to the MFP 1, a content having a large data size such as a moving image cannot be displayed on the MFP 1. Thus, the aforementioned selection processing is performed with the purpose of excluding such a content from the target of distribution.

In addition, as mentioned above, in the content information received by the content information receiving unit 132, each content name identifying a content is associated with at least the state information and the size information. Thus, the selection unit 133 can select a content name that is associated with the state information that matches the current state of the MFP 1 from content names in which the data sizes identified by the size information are equal to or lower than the threshold. For example, a case in which the threshold is 100 KB, and the content information illustrated in FIG. 17 is received by the content information receiving unit 132 is presumed. For example, when the MFP 1 starts copy processing, the state information that matches the current state of the MFP 1 will be the state information identifying "copy/scan". Thus, in this case, among the four content names illustrated in FIG. 17, the "two sides utilization promoting content" will be selected.

In addition, for example, when a plurality of contents satisfying the above-described selection condition exist, the selection unit 133 may be in a form that optionally (randomly) selects any one of such contents. Furthermore, for example, the selection unit 133 may be in a form that manages number of times of display information in which each piece of content identification information for identifying a content (for example, each content name) is associated with a number of times of display, and selects a content having the smallest number of times of display from among the plurality of contents satisfying the above-described selection condition. Furthermore, for example, the selection unit 133 may be in a form that selects the plurality of contents satisfying the above-described selection condition as they are. Moreover, in this example, the function of the selection unit 133 is implemented by the execution of the information distribution application by the CPU 21.

The content request transmitting unit 134 transmits a content request requesting a content to the content center 4. When the storage device is not connected to the MFP 1 (when the determination result of the determining unit 113 is negative), the content request transmitting unit 134 transmits the content request requesting the content selected by the selection unit 133 to the content center 4. On the other hand, when the storage device is connected to the MFP 1 (when the determination result of the determining unit 113 is positive), the content information received by the content information receiving unit 132 is input to the content request transmitting unit 134 as it is. Thus, the content request transmitting unit 134 transmits, to the content center 4, a content request requesting all of the contents identified by the content information received by the content information receiving unit 132. In this example, the function of the content request transmitting unit 134 is implemented by the combination of the CPU 21, which executes the information distribution application, and the communication I/F 25.

The content receiving unit 135 receives the content from the content center 4 as a response to the content request. In this example, the function of the content receiving unit 135 is implemented by the combination of the CPU 21 and the communication I/F 25. When the storage device is not connected to the MFP 1 (when the determination result of the determining unit 113 is negative), the content received by the content receiving unit 135 will be stored in the RAM 23 or the like, which functions as a main storage device (main memory). On the other hand, when the storage device is connected to the MFP (when the determination result of the determining unit 113 is positive), the content received by the content receiving unit 135 will be linked with the content information that has already been received by the content information receiving unit 132 for storing in the storage device (storage device that stores therein the received content) such as an HDD.

The display content decider 122 decides on a content (display content) that is the display target. In the present embodiment, when the storage device is not connected to the MFP 1 (when the determination result of the determining unit 113 is negative), the display content decider 122 decides on the content received by the content receiving unit 135 as the display content as it is. On the other hand, when the storage device is connected to the MFP 1 (when the determination result of the determining unit 113 is positive), the display content decider 122 decides on a content corresponding to the display timing that matches the current state of the MFP 1 among one or more contents received by the content receiving unit 135, as the display content. As mentioned above, in the storage device (storage device such as an HDD) that stores therein the received content, a content and content information are stored by being linked. Thus, the display content decider 122 can identify the content corresponding to the display timing that matches the current state of the MFP 1 by referring to the display timing contained in the content information linked with the content, for each of the one or more contents received by the content receiving unit 135. This identification method is similar to the selection method of a content in the aforementioned case in which the storage device is not connected to the MFP 1. Furthermore, in this example, the function of the display content decider 122 is implemented by the execution of the information distribution application by the CPU 21.

Returning to FIG. 4, the explanation of the function possessed by the MFP 1 will be continued. The display control unit 115 performs a control to display the content acquired by the content acquisition unit 114 (the content received by the content receiving unit 135) on the operation panel 27 (display unit). In this example, the function of the display control unit 115 is implemented by the execution of the information distribution application by the CPU 21. However, not limited to this, it may be implemented by, for example, a dedicated hardware circuit.

FIG. 18 is a sequence diagram illustrating an example of a procedure for generating a content based on apparatus information. As illustrated in FIG. 18, once the apparatus information transmitting unit 112 of the MFP 1 detects the timing of giving a notice of apparatus information to the apparatus information management center 3 (Step S1), it transmits an apparatus information request requesting the apparatus information to the basic function unit 111 (Step S2). In this example, the basic function unit 111 manages the apparatus information. The basic function unit 111 transmits the apparatus information to the apparatus information transmitting unit 112 as a response to the apparatus information (Step S3). The apparatus information transmitting unit 112 transmits the apparatus information received from the basic function unit 111 to the apparatus information management center 3 (Step S4).

Once the apparatus information receiving unit 311 of the apparatus information management center 3 receives apparatus information from the MFP 1, it transmits the received apparatus information to the apparatus information transmitting unit 312 (Step S5). The apparatus information transmitting unit 312 of the apparatus information management center 3 transmits the apparatus information received from the apparatus information receiving unit 311 to the content center 4 (Step S6).

Once the apparatus information receiving unit 411 of the content center 4 receives the apparatus information from the apparatus information management center 3, it writes the received apparatus information in the apparatus information storing unit 412 (Step S7). As mentioned above, for example, the apparatus information receiving unit 411 may be in a form that writes only the information that is needed to generate predetermined one or more contents among the pieces of information contained in the apparatus information received from the apparatus information management center 3, in the apparatus information storing unit 412.

Next, once the content generation unit 413 detects the timing of generating a content (Step S8), it transmits an apparatus information request requesting apparatus information to the apparatus information storing unit 412 (Step S9), and receives the apparatus information as a response to the apparatus information request (Step S10). Furthermore, the content generation unit 413 generates a content based on the apparatus information (Step S11), and writes the generated content in the content storage unit 414 (Step S12). More specifically, the content generation unit 413 links the generated content with an apparatus ID, and write them in the content storage unit 414.

FIG. 19 is a sequence diagram illustrating an example of a procedure of the MFP 1 to acquire a content from the server system 2 for display. As illustrated in FIG. 19, when detecting the start of electricity supply (power-on) to the MFP 1 (Step S21), the basic function unit 111 gives a notice of the detection of power-on to the determining unit 113 (Step S22). The determining unit 113 that has received this notice determines whether the storage device is connected to the MFP 1 (Step S23). FIG. 19 makes an explanation by using a case in which the determination result at Step S23 is negative, that is, a case in which the storage device is not connected to the MFP 1, as an example. A procedure in the case in which the determination result at Step S23 is positive is represented by the sequence diagram illustrated in FIG. 20 that will be mentioned later. The determining unit 113 gives a notice of the determination result at Step S23 to the content acquisition unit 114 (Step S24).

Next, once the basic function unit 111 starts processing such as start of copy processing, start of scan processing, or start of login processing, for example (becomes a state corresponding to the timing of displaying a content) (Step S25), it asks the display control unit 115 to display the content (Step S26). This asking contains information indicating the processing that the MFP 1 has started (that is, information indicating the current state of the MFP 1). For example, when the MFP 1 starts copy processing, information indicating that the copy processing has started (any information that can identify the start of copy processing) will be contained in the above-described asking as information indicating the current state of the MFP 1. The display control unit 115 that received this asking, requests the content to the content acquisition unit 114 (Step S27). This request also contains the information indicating the current state of the MFP 1.

The content acquisition unit 114 that received the request of content acquisition from the display control unit 115 transmits the aforementioned content information request to the content center 4 (Step S28). Once the content information request receiving unit 415 of the content center 4 receives the content information request from the MFP 1, it passes the received content information request to the content information transmitting unit 416 (Step S29). The content information transmitting unit 416 transmits the content information to the MFP 1 as a response to the content information request (Step S30). The specific detail is as mentioned above.

The content acquisition unit 114 of the MFP 1 that received the content information as a response to the content information request selects a content satisfying the above-described selection condition from among one or more contents identified by the received content information (Step S31). The specific detail is as mentioned above. As mentioned above, the request (request for the content) passed from the display control unit 115 to the content acquisition unit 114 contains the information indicating the current state of the MFP 1. Thus, based on this information indicating the current state of the MFP 1 and the received content information, the content acquisition unit 114 can select a content having a data size that is equal to or lower than a threshold and being associated with the display timing that matches the current state of the MFP 1, from among the one or more contents identified by the content information.

Next, the content acquisition unit 114 transmits a content request requesting the content selected at Step S31 to the content center 4 (Step S32). Once the content request receiving unit 417 of the content center 4 receives the content request from the MFP 1, it passes the received content request to the content transmitting unit 418 (Step S33). The content transmitting unit 418 transmits the requested content to the MFP 1 as a response to the content request (Step S34).

Once the content acquisition unit 114 of the MFP 1 receives the content from the content center 4 as a response to the content request, it decides on the display content in the manner mentioned above (Step S35), and passes the decided display content to the display control unit 115 (Step S36). The display control unit 115 performs a control to display the display content received from the content acquisition unit 114 on the operation panel 27 (Step S37).

FIG. 20 is a sequence diagram illustrating an example of an operating procedure when the determination result in S23 in FIG. 19 is positive, that is, when the storage device is connected to the MFP 1. The detail of the processing through Step S41 to Step S44 in FIG. 20 is the same as the detail of the processing through Step S21 to Step S24 illustrated in FIG. 19. In the following, an explanation will be made by using a case in which the determination result at Step S43 is positive, that is, a case in which the storage device is connected to the MFP 1, as an example.

The content acquisition unit 114 that received the notice of the determination result at Step S44 detects the timing of acquiring a content (Step S45). In this example, when the storage device that stores therein the received content is connected to the MFP 1, the content acquisition unit 114 will regularly acquire the content for storing in the storage device. The timing of acquiring the content can be optionally set.

Next, the content acquisition unit 114 transmits the aforementioned content information request to the content center 4 (Step S46). Once the content information request receiving unit 415 of the content center 4 receives the content information request from the MFP 1, it passes the received content information request to the content information transmitting unit 416 (Step S47). The content information transmitting unit 416 transmits the content information to the MFP 1 as a response to the content information request (Step S48).

The content acquisition unit 114 of the MFP 1 that received the content information as a response to the content information request transmits, to the content center 4, a content request requesting one or more contents identified by the received content information (Step S49). Once the content request receiving unit 417 of the content center 4 receives the content request from the MFP 1, it passes the received content request to the content transmitting unit 418 (Step S50). The content transmitting unit 418 transmits the requested content to the MFP 1 as a response to the content request (Step S51). The content acquisition unit 114 of the MFP 1 links the content received from the content center 4 as a response to the content request, with the content information received at the aforementioned Step S48 for storing in the storage device (Step S52).

Next, once the basic function unit 111 starts processing such as copy processing, scan processing, login processing, or the like, for example (Step S53), it asks the display control unit 115 to display the content (Step S54). The display control unit 115 that received this asking, requests the content from the content acquisition unit 114 (Step S55). The content acquisition unit 114 that received this request decides on the display content (Step S56). More specifically, the content acquisition unit 114 decides on, from among the contents stored in the storage device, a content linked with the content information containing the display timing that matches the current state of the MFP 1 as the display content. The specific detail is as mentioned above. In this example, the request (request for the content) from the display control unit 115 contains the information indicating the current state of the MFP 1. Thus, based on this information indicating the current state of the MFP 1 and the information stored in the storage device (information in which each content is linked with content information), the content acquisition unit 114 can decide on, from among one or more contents stored in the storage device, a content linked with the content information containing the display timing that matches the current state of the MFP 1 as the display content.

Next, the content acquisition unit 114 passes the display content decided at Step S56 to the display control unit 115 (Step S57). Furthermore, the display control unit 115 performs a control to display the display content received from the content acquisition unit 114 on the operation panel 27 (Step S58).

Furthermore, in the example above, the determining unit 113 determines whether the storage device is connected to the MFP 1 only when the notice of the detection of power-on is given (Step S23 illustrated in FIG. 19 and Step S43 illustrated in FIG. 20). However, for example, there may be a case in which even if the storage device is connected at the time of power-on, the state is changed to a state where the storage device is not connected due to occurrence of a failure or the like at a later time. Thus, for example, as illustrated in FIG. 21, the content acquisition unit 114 can ask the determining unit 113 to determine whether the storage device is connected to the MFP 1 again, when receiving the request for the content from the display control unit 115 (Step S60). The determining unit 113 that received this asking performs the determination again (Step S61), and gives the notice of the determination result to the content acquisition unit 114 (Step S62). In this example, when the determination result at Step S61 is positive, the processing through Step S56 to Step S58 illustrated in FIG. 20 will be performed, and when the determination result at Step S61 is negative, the processing through Step S28 to Step S37 illustrated in FIG. 19 will be performed. As described above, the determining unit 113 may be in a form that determines whether the storage device is connected to the MFP 1 at the time of start of electricity supply to the MFP 1, and when the determination result is positive, determines whether the storage device is connected to the MFP 1 again when the MFP 1 is in a state corresponding to the timing of displaying the content. As mentioned above, in this example, the state corresponding to the timing of displaying the content is any one of start of copy processing, start of scan processing, and start of login processing.

As explained above, the MFP 1 in the present embodiment receives content information that can identify one or more contents from the server system 2 prior to the acquisition of a content. Furthermore, when the storage device that stores therein the content received from the server system 2 is not connected to the MFP 1, the MFP 1 selects a content having a data size that is equal to or lower than a threshold from among the one or more contents identified by the content information received from the server system 2, and acquires the selected content from the server system 2 for display. In this manner, the MFP 1 can utilize only the content suitable for the configuration thereof. In other words, according to the present embodiment, the MFP 1 is allowed to utilize a content suitable for the configuration of the MFP 1.

[Second Embodiment]

Next, the second embodiment will be explained. The present embodiment is different from the aforementioned first embodiment in that when the storage device is not connected to the MFP 1, the server system 2 (in this example, the content center 4) executes the processing of selecting a content having a data size that is equal to or lower than a threshold from among the contents distributed to the MFP 1. In the following, explanations will be made by focusing on the difference from the first embodiment, and explanations of portions that are in common with the first embodiment will be appropriately omitted.

Figure 22:
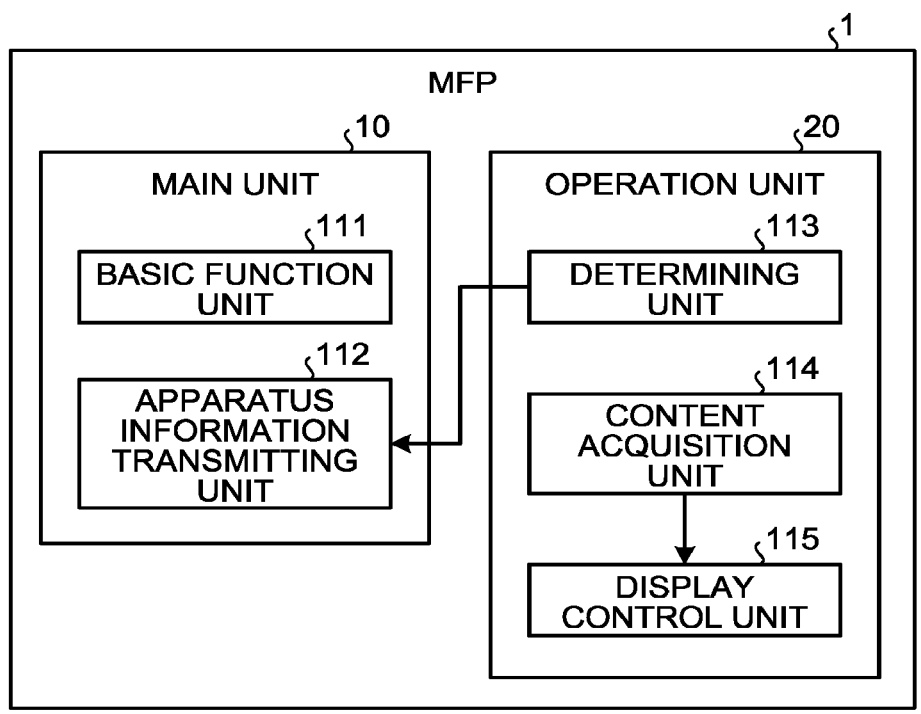
FIG. 22 is a figure illustrating an example of a function possessed by an MFP in the second embodiment.

FIG. 22 is a figure illustrating an example of a function possessed by the MFP 1 in the present embodiment. Although the basic detail is the same as that of the aforementioned first embodiment, the present embodiment is different from the aforementioned first embodiment in that the determination result of the determining unit 113 is passed to the apparatus information transmitting unit 112. As mentioned above, the determining unit 113 determines whether the storage device (for example, the storage device such as an HDD) that stores therein the content received from the server system 2 is connected to the MFP 1. The timing of this determination is optional. For example, the determination may be performed at the time of power-on of the MFP 1, or the determination may be performed in conformity to the timing of transmitting the apparatus information.

Although the function of the apparatus information transmitting unit 112 is the same as the detail explained in the aforementioned first embodiment, the apparatus information in the present embodiment contains connection information indicating whether the storage device is connected to the MFP 1 (information indicating the determination result of the determining unit 113). In other words, the apparatus information is information that contains the above-described information, and that relates to the MFP 1. FIG. 23 is a figure illustrating an example of the apparatus information in the present embodiment. In this example, the apparatus information contains the above-described connection information in addition to an apparatus ID, date and time of notification, utilization amount information, abnormality presence information, and remaining amount information.

Figure 24:
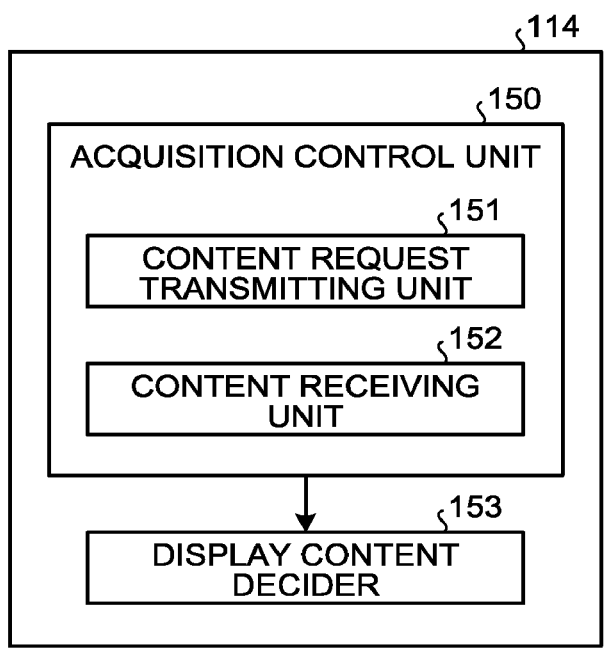
FIG. 24 is a figure illustrating an example of a detailed function of a content acquisition unit possessed by an MFP in the second embodiment.

The content acquisition unit 114 acquires a content from the server system 2. FIG. 24 is a figure illustrating an example of a detailed function of the content acquisition unit 114. As illustrated in FIG. 24, the content acquisition unit 114 has an acquisition control unit 150 and a display content decider 153.

The acquisition control unit 150 contains a content request transmitting unit 151 and a content receiving unit 152. The content request transmitting unit 151 transmits a content request requesting a content to the content center 4. In this example, the content request contains at least the apparatus ID of the MFP 1. The utilization method of the apparatus ID will be made clear in an explanation that will be mentioned later. The content receiving unit 152 receives the content from the content center 4 as a response to the content request. Although the detail will be mentioned later, the content receiving unit 152 in the present embodiment receives a set (one or more sets) of a content and additional information that will be mentioned later containing at least the state information of the content, as a response to the content request.

The display content decider 153 decides on the display content. In the present embodiment, the display content decider 153 decides on a content corresponding to the display timing that matches the current state of the MFP 1 from among one or more contents received by the content receiving unit 152, as the display content. In this example, the content receiving unit 152 receives, from the content center 4, the set of a content and additional information that will be mentioned later containing at least the state information of the content as a response to the content request. Thus, the display content decider 153 can identify a content corresponding to the display timing that matches the current state of the MFP 1 by referring to the display timing contained in the additional information of the set, for each of the sets received by the content receiving unit 152. Furthermore, the decision method of the display content when a plurality of contents identified in such a manner exist, is the same as the detail explained in the aforementioned first embodiment.

Returning to FIG. 22, the explanation will be continued. The display control unit 115 performs a control to display the content acquired by the content acquisition unit 114 (content received by the content receiving unit 152) on the operation panel 27. More specifically, the display control unit 115 performs a control to display the display content passed from the content acquisition unit 114 on the operation panel 27.

Figure 25:
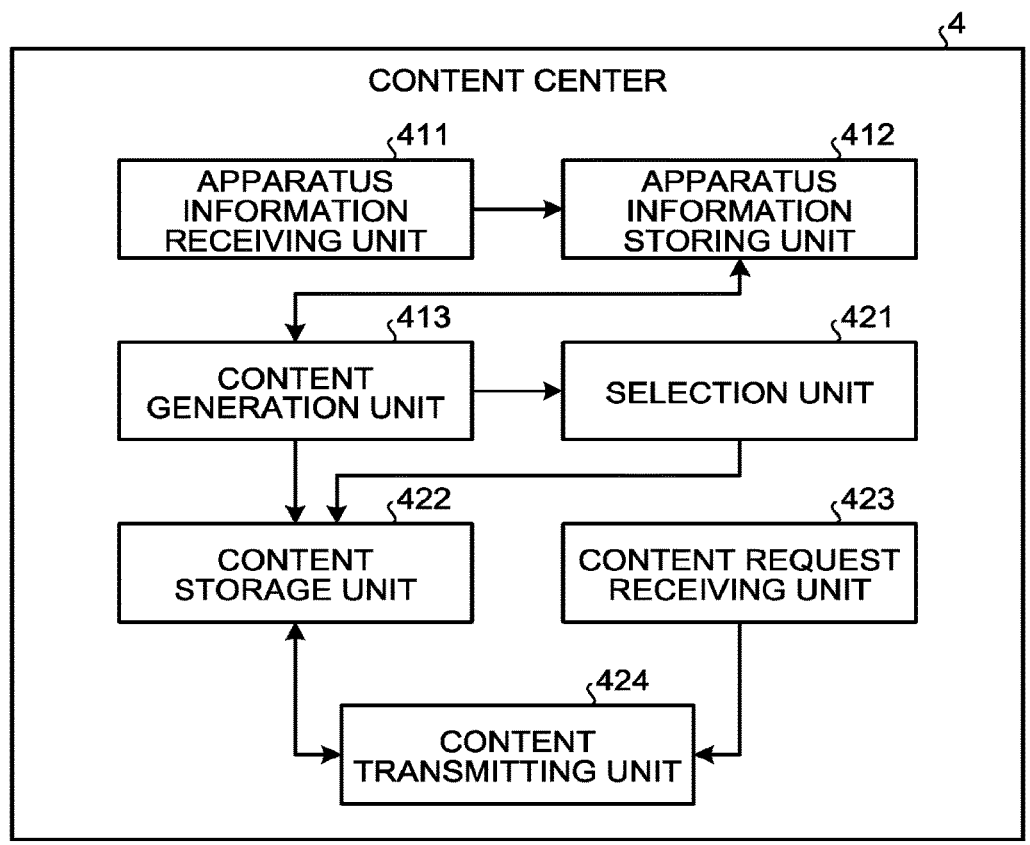
FIG. 25 is a figure illustrating an example of a function possessed by a content center in the second embodiment.

Since the configuration of the apparatus information management center 3 is the same as that in the aforementioned first embodiment, the detailed explanation will be omitted. Next, a function possessed by the content center 4 will be explained by using FIG. 25. As illustrated in FIG. 25, the content center 4 has the apparatus information receiving unit 411, the apparatus information storing unit 412, the content generation unit 413, a selection unit 421, a content storage unit 422, a content request receiving unit 423, and a content transmitting unit 424. Since the functions of each of the apparatus information receiving unit 411, the apparatus information storing unit 412, and the content generation unit 413 are the same as those explained in the aforementioned first embodiment, the detailed explanation will be omitted.

In this example, when generating contents based on apparatus information that contains connection information indicating that the storage device is connected to the MFP 1, the content generation unit 413 stores, for each of the generated contents, information (referred to as the "linked information") in which additional information containing at least the state information of the content is linked with an apparatus ID contained in the apparatus information, in the content storage unit 422. On the other hand, when generating contents based on apparatus information that contains connection information indicating that the storage device is not connected to the MFP 1, the content generation unit 413 passes the above-described linked information to the selection unit 421, and asks for the selection of a content.

The selection unit 421 selects a content having a data size that is equal to or lower than a threshold from among the one or more contents generated based on the apparatus information that contains the connection information indicating that the storage device is not connected to the MFP 1. In the present embodiment, the selection unit 421 that received the asking from the content generation unit 413 selects a content having a data size that is equal to or lower than the threshold from among the contents contained in the linked information passed from the content generation unit 413, and links the selected content with the additional information of the selected content and the apparatus ID for storing in the content storage unit 422.

The content request receiving unit 423 receives the aforementioned content request from the MFP 1. The content transmitting unit 424 transmits the content to the MFP 1 as a response to the content request received by the content request receiving unit 423. More specifically, the content transmitting unit 424 reads a set (one or more sets) of a content and additional information linked with the apparatus ID contained in the content request received by the content request receiving unit 423 from the content storage unit 422, and transmits the read one or more sets to the MFP 1.

In short, the content transmitting unit 424 has a function of transmitting one or more contents selected by the selection unit 421 to the MFP 1 as a response to the content request from the MFP 1 where the storage device is not connected.

Figure 26:
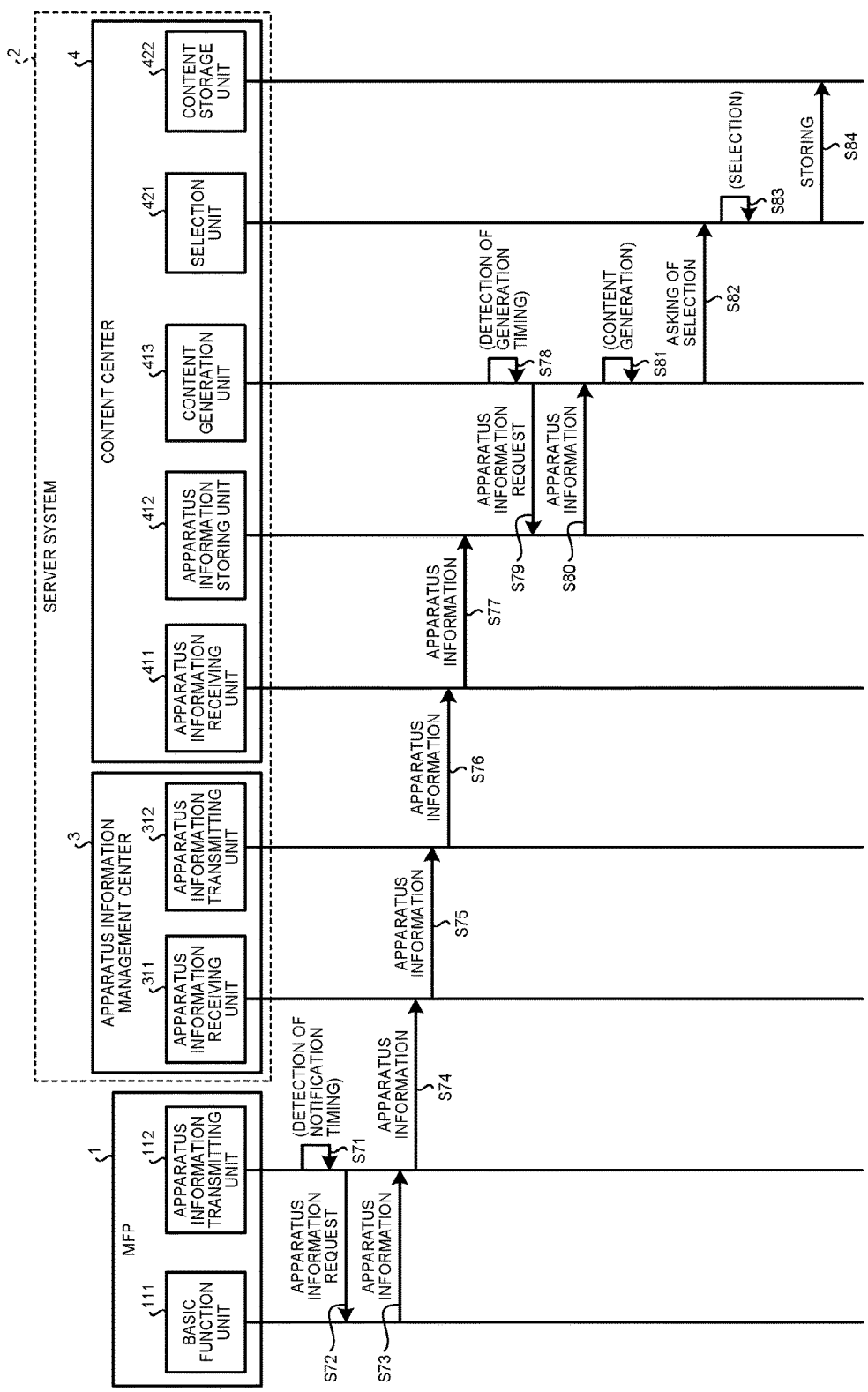
FIG. 26 is a sequence diagram illustrating an example of an operating procedure of an information processing system in the second embodiment.

FIG. 26 is a sequence diagram illustrating an example of a procedure for generating a content based on apparatus information in the present embodiment. The detail of processing through Step S71 to Step S81 illustrated in FIG. 26 is the same as the detail of processing through Step S1 to Step S11 illustrated in FIG. 18.

In this example, an explanation will be made by using a case in which the content generation unit 413 generates a content based on apparatus information that contains connection information indicating that the storage device is not connected to the MFP 1 at Step S81, as an example. After Step S81, the content generation unit 413 asks the selection unit 421 to select a content (Step S82). The selection unit 421 that received this asking selects a content having a data size that is equal to or lower than a threshold among the one or more contents generated at Step S81 (Step S83). Furthermore, the selection unit 421 links the content selected at Step S83 with the aforementioned additional information and the apparatus ID for storing in the content storage unit 422 (Step S84).

Furthermore, when the content generation unit 413 generates contents based on apparatus information that contains connection information indicating that the storage device is connected to the MFP 1 at Step S81, for each of all the generated contents, the aforementioned additional information and the apparatus ID will be linked for storing in the content storage unit 422.

FIG. 27 is a sequence diagram illustrating an example of a procedure of the MFP 1 to acquire a content from the server system 2 for display in the present embodiment. In the example illustrated in FIG. 27, firstly, once the basic function unit 111 starts processing such as copy processing, scan processing, or login processing, for example (Step S91), it asks the display control unit 115 to display the content (Step S92). The display control unit 115 that received this asking, requests the content to the content acquisition unit 114 (Step S93). The processing detail described above is the same as the processing detail through Step S25 to Step S27 illustrated in FIG. 19.

Next, the content acquisition unit 114 transmits the aforementioned content request to the content center 4 (Step S94). Once the content request receiving unit 423 of the content center 4 receives the content request from the MFP 1, it transmits the received content request to the content transmitting unit 424 (Step S95). The content transmitting unit 424 transmits the content to the MFP 1 as a response to the content request (Step S96). While the specific detail is as mentioned above, the content transmitting unit 424 transmits the set of the content and the additional information to the MFP 1.

The content acquisition unit 114 that acquired one or more contents from the content center 4 as a response to the content request decides on, from among the acquired one or more contents, a content corresponding to the display timing that matches the current state of the MFP 1 as the display content (Step S97). The specific detail is as mentioned above. Furthermore, the content acquisition unit 114 passes the display content decided at Step S97 to the display control unit 115 (Step S98). The display control unit 115 performs a control to display the display content received from the content acquisition unit 114 on the operation panel 27 (Step S99).

As explained above, the content center 4 in the present embodiment selects a content having a data size that is equal to or lower than a threshold from among one or more contents generated based on apparatus information that contains connection information indicating that the storage device is not connected to the MFP 1, and distributes the selected content to the MFP 1. In this manner, the MFP 1 can utilize only the content suitable for the configuration thereof. In other words, according to the present embodiment, the MFP 1 is allowed to utilize a content suitable for the configuration of the MFP 1.

Although the embodiments defined by the present invention have been explained above, the present invention is not limited to the aforementioned embodiments as they are, and modifications of components can be implemented without departing from the scope of the invention in the implementation phase. In addition, various inventions can be formed by appropriately combining the plurality of components disclosed in the aforementioned embodiments. For example, several components may be deleted from all components illustrated in the aforementioned embodiments. Furthermore, components throughout various embodiments and modification examples may be appropriately combined.

In addition, in the aforementioned embodiment, the main unit 10 and the operation unit 20 operate independently of each other with separate operating systems (OS). However, not limited to this, for example, a form in which the main unit 10 and the operation unit 20 operate with the same operation system may be used.

In addition, a form in which a single server having the function of the aforementioned apparatus information management center 3 and the function of the content center 4 is provided may be used, or a form in which the function of the aforementioned apparatus information management center 3 and the function of the content center 4 are equipped by being dispersed to three or more servers may be used. In short, the server system 2 only needs to be in a form that includes one or more servers.

In addition, a computer program to be executed by respective devices (the MFP 1, the apparatus information management center 3, and the content center 4) included in the information processing system 100 in each of the aforementioned embodiments may be configured such that it is provided by being recorded on a computer readable recording medium such as a CD-ROM, a flexible disk (FD), a CD-R, a digital versatile disc (DVD), a universal serial bus (USB), or the like in an installable format or executable format file, or may be configured such that it is provided or distributed via a network such as the Internet. Furthermore, various computer programs may be configured to be provided by being incorporated into a ROM or the like in advance.

REFERENCE SIGNS LIST

1 MFP
2 server system
3 apparatus information management center
4 content center
8 network
10 main unit
20 operation unit
100 information processing system
111 basic function unit
112 apparatus information transmitting unit
113 determining unit
114 content acquisition unit
115 display control unit
121 acquisition control unit
122 display content decider
131 content information request transmitting unit
132 content information receiving unit
133 selection unit
134 content request transmitting unit
135 content receiving unit
311 apparatus information receiving unit
312 apparatus information transmitting unit
411 apparatus information receiving unit
412 apparatus information storing unit
413 content generation unit
414 content storage unit
415 content information request receiving unit
416 content information transmitting unit 417 content request receiving unit
418 content transmitting unit

CITATION LIST

Patent Literature

Patent Literature 1: Japanese Patent No. 5468829
The invention claimed is:

1. An information processing system, comprising:
an apparatus; and
a server system including one or more servers connectable with the apparatus via a network,
the server system comprising:
first circuitry configured to receive apparatus information indicating information related to the apparatus;
generate a content for indicating information to be conveyed to a user based on the received apparatus information;
receive a content information request requesting content information indicating information capable of identifying the content from the apparatus;
transmit, to the apparatus, the generated content information capable of identifying one or more contents as a response to the content information request;
receive a content request requesting the content from the apparatus; and
transmit the content to the apparatus as a response to the content request,
the apparatus comprising:
second circuitry configured to transmit the apparatus information to the server system;
transmit the content information request to the server system;
receive the content information from the server system as a response to the content information request;
select a content satisfying a predetermined condition from among the one or more contents identified by the received content information received when a storage device is not connected to the apparatus;
transmit the content request requesting the selected content to the server system; and
receive the content from the server system as a response to the content request.

2. The information processing system according to claim 1, wherein the predetermined condition indicates that a data size of the content is equal to or lower than a threshold.

3. The information processing system according to claim 1, wherein the storage device is a nonvolatile storage device.

4. The information processing system according to claim 3, wherein the nonvolatile storage device is an HDD or a flash memory.

5. The information processing system according to claim 1, wherein
the apparatus information contains utilization amount information indicating a utilization amount of a function possessed by the apparatus, and
the first circuitry is further configured to generate the content for indicating trends in use of the function possessed by the apparatus, using the utilization amount information contained in the apparatus information.

6. The information processing system according to claim 1, wherein
the apparatus information contains abnormality presence information indicating whether there is an abnormality in the apparatus, and when the apparatus has an abnormality, also indicating information related to the abnormality, and
the first circuitry is further configured to, when the abnormality presence information indicates that the apparatus has an abnormality and also indicates information related to the abnormality, generate the content for indicating dispatch of a responder and information related to the abnormality.

7. The information processing system according to claim 1, wherein
the apparatus information contains remaining amount information indicating a remaining amount of consumables of the apparatus, and
the first circuitry is further configured to generate the content for indicating a delivery status of the consumables, when the remaining amount indicated by the remaining amount information contained in the apparatus information is equal to or lower than a threshold.

8. The information processing system according to claim 1, wherein
the content information is information in which each piece of content identification information identifying the content is associated with at least state information identifying a state of the apparatus corresponding to timing of displaying the content and size information for identifying a data size of the content, and
the second circuitry is further configured to select the content identification information for which the data size identified by the size information is equal to or lower than the threshold and that corresponds to the state information that matches a current state of the apparatus, from among pieces of the content identification information contained in the content information received by the second circuitry.

9. The information processing system according to claim 1, wherein the second circuitry is further configured to determine whether the storage device is connected to the apparatus.

10. The information processing system according to claim 9, wherein the second circuitry is further configured to determine whether the storage device is connected to the apparatus at time of start of electricity supply to the apparatus, and determine whether the storage device is connected to the apparatus again when the determination result is positive, and when the apparatus is in a state corresponding to timing of displaying the content.

11. The information processing system according to claim 10, wherein the state corresponding to the timing of displaying the content is any of start of copy processing, start of scan processing, and start of login processing.

12. The information processing system according to claim 1, wherein
the apparatus comprises an operation unit configured to accept an operation and a main unit configured to perform an operation in accordance with the operation accepted by the operation unit, and
the operation unit and the main unit operate independently of each other with separate operating systems.

13. An apparatus connectable with a server system including one or more servers via a network, the apparatus comprising:
circuitry configured to
transmit apparatus information indicating information related to the apparatus to the server system;

transmit a content information request requesting content information capable of identifying a content for indicating information to be conveyed to a user to the server system;

receive the content information from the server system as a response to the content information request;

select a content satisfying a predetermined condition from among the one or more contents identified by the received content information when a storage device is not connected to the apparatus;

transmit a content request requesting the selected content to the server system; and receive the content from the server system as a response to the content request.

14. An information processing method performed by an apparatus connectable with a server system including one or more servers via a network, the information processing method comprising:

transmitting, by circuitry, apparatus information indicating information related to the apparatus to the server system;

transmitting, by the circuitry, a content information request requesting content information capable of identifying a content for indicating information to be conveyed to a user to the server system;

receiving, by the circuitry, the content information from the server system as a response to the content information request;

selecting, by the circuitry, a content satisfying a predetermined condition from among the one or more contents identified by the content information received at the receiving the content information when a storage device is not connected to the apparatus;

transmitting, by the circuitry, a content request requesting the content selected at the selecting to the server system; and receiving, by the circuitry, the content from the server system as a response to the content request.

* * * * *